United States Patent
Coluzzi et al.

(10) Patent No.: US 7,187,327 B2
(45) Date of Patent: Mar. 6, 2007

(54) METHOD AND SYSTEM FOR DETERMINING THE POSITION OF AN OBJECT

(75) Inventors: Michael Eugene Coluzzi, Los Angeles, CA (US); Sung Phill Kang, La Mirada, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 147 days.

(21) Appl. No.: 10/814,649

(22) Filed: Apr. 1, 2004

(65) Prior Publication Data
US 2006/0250305 A1    Nov. 9, 2006

(51) Int. Cl.
G01S 3/02    (2006.01)
G01S 1/24    (2006.01)
(52) U.S. Cl. .................................. 342/458; 342/387
(58) Field of Classification Search ................ 342/458, 342/387, 463–465
See application file for complete search history.

(56) References Cited

U.S. PATENT DOCUMENTS

| | | | |
|---|---|---|---|
| 4,626,861 A | 12/1986 | Wiley | |
| 4,910,526 A | 3/1990 | Donnangelo et al. | |
| 5,075,694 A | 12/1991 | Donnangelo et al. | |
| RE34,004 E | 7/1992 | Rogoff et al. | |
| 5,446,461 A | 8/1995 | Frazier | |
| 5,508,708 A | 4/1996 | Ghosh et al. | |
| 5,526,001 A | 6/1996 | Rose et al. | |
| 5,615,175 A | 3/1997 | Carter et al. | |
| 5,659,520 A | 8/1997 | Watson et al. | |
| 5,737,431 A * | 4/1998 | Brandstein et al. | ........... 381/92 |
| 5,740,048 A * | 4/1998 | Abel et al. | ................. 701/200 |
| 5,920,278 A | 7/1999 | Tyler et al. | |
| 5,999,116 A | 12/1999 | Evers | |
| 6,094,169 A | 7/2000 | Smith et al. | |
| 6,211,811 B1 | 4/2001 | Evers | |
| 6,236,365 B1 | 5/2001 | LeBlanc et al. | |
| 6,249,252 B1 | 6/2001 | Dupray | |
| 6,378,801 B1 | 4/2002 | Pell et al. | |
| 6,512,478 B1 | 1/2003 | Chien | |
| 6,522,296 B2 | 2/2003 | Holt | |
| 6,536,553 B1 | 3/2003 | Scanlon | |
| 6,563,461 B1 * | 5/2003 | Elgersma et al. | ........... 342/458 |
| 6,615,155 B2 | 9/2003 | Gilboa | |
| 6,826,284 B1 * | 11/2004 | Benesty et al. | ............... 381/92 |
| 2001/0022558 A1 | 9/2001 | Karr, Jr. et al. | |

(Continued)

OTHER PUBLICATIONS

A. Urruela et al., Average performance analysis of circular and hyperbolic geolocation, IEEE Transactions on Vehicular Technology, vol. 55(1), p. 52-66, Jan. 2006.*

(Continued)

*Primary Examiner*—Thomas H. Tarcza
*Assistant Examiner*—Fred H Mull
(74) *Attorney, Agent, or Firm*—Hunton and Williams LLP

(57) ABSTRACT

A method and system for determining the location of an object. The system may implement a number of sensors at different locations that are positioned to receive a transmitted or reflected signal from the object. Also disclosed is a system and method of calculating object position based upon the time difference of arrival (TDOA) from each sensor, or the relative time difference of arrival (RTDOA). A known distribution of noise is added to the time of arrival (TOA) prior to calculating the object position.

5 Claims, 25 Drawing Sheets

U.S. PATENT DOCUMENTS

| | | |
|---|---|---|
| 2002/0167444 A1* | 11/2002 | Lee .......................... 342/387 |
| 2002/0196186 A1 | 12/2002 | Holt |
| 2002/0196187 A1 | 12/2002 | Holt |
| 2002/0196188 A1 | 12/2002 | Holt |
| 2002/0196327 A1 | 12/2002 | Rui et al. |
| 2003/0008265 A1 | 1/2003 | Hulet |
| 2003/0043073 A1 | 3/2003 | Gray et al. |
| 2003/0048224 A1 | 3/2003 | Benner et al. |
| 2003/0052821 A1 | 3/2003 | Holt |
| 2003/0085840 A1 | 5/2003 | Benner et al. |
| 2004/0022214 A1* | 2/2004 | Goren et al. ................ 370/332 |
| 2004/0235497 A1* | 11/2004 | Zekavat ................... 455/456.1 |
| 2005/0222757 A1* | 10/2005 | Coluzzi et al. ............. 701/207 |

OTHER PUBLICATIONS

K.W. Cheung et al., Accurate approximation algorithm for TOA-based maximum likelihood mobile location using semidefinite programming, IEEE International Conference Acoustics, Speech, and Signal Processing, vol. 2, p. II-145-II-148, May 2004.*

Y. T. Chan et al., A Simple and Efficient Estimator for Hyperbolic Location, IEEE Transactions on Signal Processing, vol. 42, No. 8, Aug. 1994, 1905-1915.

* cited by examiner

METHOD AND SYSTEM FOR DETERMINING THE POSITION OF AN OBJECT

FIELD OF THE INVENTION

The invention relates to a system and method for determining the position of an object using a frequency based sensor system (e.g., radar, sonar, global positioning satellites (GPS), cellular telephony, etc.).

BACKGROUND OF THE INVENTION

Accurately determining the position of moving objects, such as aircraft, missiles, land-vehicles, watercraft, and electronic devices (e.g., mobile telephones) has been a challenge for sometime. There have been many methods developed, including radar, sonar, GPS and other frequency based techniques.

Typically, object location systems make use of multilateration techniques (i.e., the fixing of a position by the time difference of arrival (TDOA) of a signal at a sensor) to locate the origin of a transmitted signal. TDOA information is typically based on signal arrival-time measurements from an object that transmits, reflects or receives and re-transmits a signal that is received at receiving sensors. The TDOA measurements and other sensor information is typically transmitted to a central processor for processing.

Methods for estimating position using TDOA are known. For example, "A Simple and Efficient Estimator for Hyperbolic Location" by Y. T. Chan and K. C. Ho. (IEEE Transactions on Signal processing, Vol. 42, No. 8, August 1994, pp. 1905–1915), which is incorporated herein by reference, provides techniques for implementing TDOA measurements.

Other methods for determining the location and identification of a object are also known. For example, U.S. Pat. No. 6,211,811, issued to Evers, discloses a method and apparatus for improving the surveillance coverage and object identification in a radar based surveillance system.

Another known method is disclosed in U.S. Pat. No. 6,201,499, issued to Hawkes et al. As disclosed therein, it is known to provide a method and apparatus for measuring the time difference of arrival between two received signals, each received signal being a time delayed version of a transmitted signal as intercepted at two different sensors where the transmitted signal is generated by a radio frequency transmitter.

Many drawbacks are present in existing systems and methods. For example, known systems and methods are often inaccurate and costly to implement. Other drawbacks also exist.

SUMMARY OF THE INVENTION

The present invention provides systems and methods for enabling computations that can be used to determine the position of a object using signal data at multiple sensors. Signal data may comprise any of Time of Arrival (TOA) data, Time Difference of Arrival (TDOA) data and Relative Time of Arrival (RTOA) data. These computations serve as an aid in the development position locating systems such as next generation air traffic control radar systems or the like.

Accordingly, there is provided a method for determining the position of an object in a system comprising multiple sensors arranged at differing heights and including a reference sensor. In some embodiments the method may comprise transmitting or reflecting a signal from a object and then determining the time of transmission or reflection of the signal from the object. The method may then include receiving the transmitted or reflected signal at the multiple sensors and determining the TOA of the signal at each sensor. A processor-based calculator may calculate a slant range from the object to each sensor and a processor based calculator may calculate a position vector of the object.

In accordance with some embodiments of the invention, there is provided a method for determining the position of a object in a system comprising multiple sensors arranged at differing heights and including a reference sensor. According to these embodiments, the method may comprise transmitting or reflecting a signal from a object and determining the time of transmission or reflection of the signal from the object. The method also includes receiving the transmitted or reflected signal at the multiple sensors and determining the TDOA of the signal at each sensor. Then, processor based calculators may be used to calculate a slant range from the object to each sensor and to calculate a position vector for the object.

In accordance with some other embodiments of the invention there is provided a method for determining the position of an object in a system comprising a sensor arranged at a determinable location and a secondary surveillance device that, at a determinable transmission time, transmits an interrogator signal that is reflected off the object, or received and retransmitted by the object, to a secondary sensor. In these embodiments the method may comprise obtaining a time of arrival for a signal received at the sensor and obtaining a secondary time of arrival for the reflected or retransmitted interrogator signal received at the secondary sensor. The method may also include implementing a processor-based calculator to calculate a slant range from the object to the sensor based, at least in part, upon the obtained time of arrival at the sensor and to calculate a secondary slant range from the object to the secondary sensor based, at least in part, upon the obtained secondary time of arrival at the secondary sensor. Finally, a processor-based calculator may be implemented to determine a position vector based, at least in part upon the transmission time of the interrogator signal, the calculated slant range and the calculated secondary slant range.

In accordance with some other embodiments of the invention there is provided a method for determining the position of an object in a system comprising a sensor arranged at a determinable location. In these embodiments, the method may comprise obtaining a time of arrival for a signal received at the sensor. Then a processor based calculator may calculate a slant range from the object to the sensor based, at least in part, upon the obtained time of arrival. Finally a processor based calculator may enable a determination of a position vector based, at least in part, upon the calculated slant range and the location of the sensor.

In accordance with some other embodiments of the invention there is provided a method for determining the position of an object in a system comprising a sensor arranged at a determinable location and a reference sensor. In these embodiments the method may comprise obtaining a time difference of arrival for a signal received at the sensor with respect to a signal received at the reference sensor and implementing a processor based calculator to calculate a slant range from the object to the sensor based, at least in part, upon the obtained time difference of arrival. The method may also include enabling a processor based calculator to determine a position vector based, at least in part, upon the calculated slant range and the location of the sensor.

In accordance with some other embodiments of the invention there is provided a system for determining the position of an object. In these embodiments the system may comprise a sensor, arranged at a determinable location, that obtains a time of arrival for a signal received at the sensor and a secondary surveillance device that, at a determinable transmission time, transmits an interrogator signal that is reflected off the object, or received and retransmitted by the object, to a secondary sensor and obtains a secondary time of arrival for the reflected or retransmitted interrogator signal received at the secondary sensor. The system may also comprise a slant range calculator that calculates a slant range from the object to the sensor based, at least in part, upon the obtained time of arrival at the sensor and a secondary slant range calculator that calculates a secondary slant range from the object to the secondary sensor based, at least in part, upon the obtained secondary time of arrival at the secondary sensor. Finally, the system may comprise a position vector calculator that determines a position vector based, at least in part upon the transmission time of the interrogator signal, the calculated slant range and the calculated secondary slant range.

In accordance with some other embodiments of the invention, there is provided a system for determining the position of an object. In these embodiments the system may comprise a sensor arranged at a determinable location and a reference sensor, wherein a time difference of arrival is obtained for a signal received at the sensor with respect to a signal received at the reference sensor. The system may also comprise a slant range calculator that calculates a slant range from the object to the sensor based, at least in part, upon the obtained time difference of arrival and a position vector calculator that determines a position vector based, at least in part, upon the calculated slant range and the location of the sensor.

In accordance with some other embodiments of the invention there is provided a system for determining the position of an object. In these embodiments the system may comprise a sensor arranged at a determinable location wherein the sensor obtains a time of arrival for a signal received at the sensor and a slant range calculator that calculates a slant range from the object to the sensor based, at least in part, upon the obtained time of arrival. In addition, the system may comprise a position vector calculator that determines a position vector based, at least in part, upon the calculated slant range and the location of the sensor.

Other aspects and features of the invention are possible. The following is a description of some exemplary embodiments of the invention.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements.

FIG. 14($b$) is a plot of TDOA computation error contours with four sensors according to one embodiment of the invention.

FIG. 14($c$) is a plot of TDOA computation error contours with five sensors according to one embodiment of the invention.

DETAILED DESCRIPTION OF THE INVENTION

The following description is intended to convey a thorough understanding of the invention by providing a number of specific embodiments and details. It should be understood, however, that the invention is not limited to these specific embodiments and details, which are provided for exemplary purposes only. It should be further understood that one possessing ordinary skill in the art, in light of known apparatuses and methods, would appreciate the use of the invention for its intended purposes and benefits in any number of alternative embodiments, depending upon specific design and other needs.

The present invention provides a relatively efficient and cost-effective method and apparatus for determining the location of an object. For example, FIG. 1 is a schematic representation of an embodiment of the invention wherein the position vector (i.e., the distance and angular orientation as measured from an origin) of an object 100 may be determined via information gathered at a number of sensors 102, 104, 106, 108.

Figure 1:
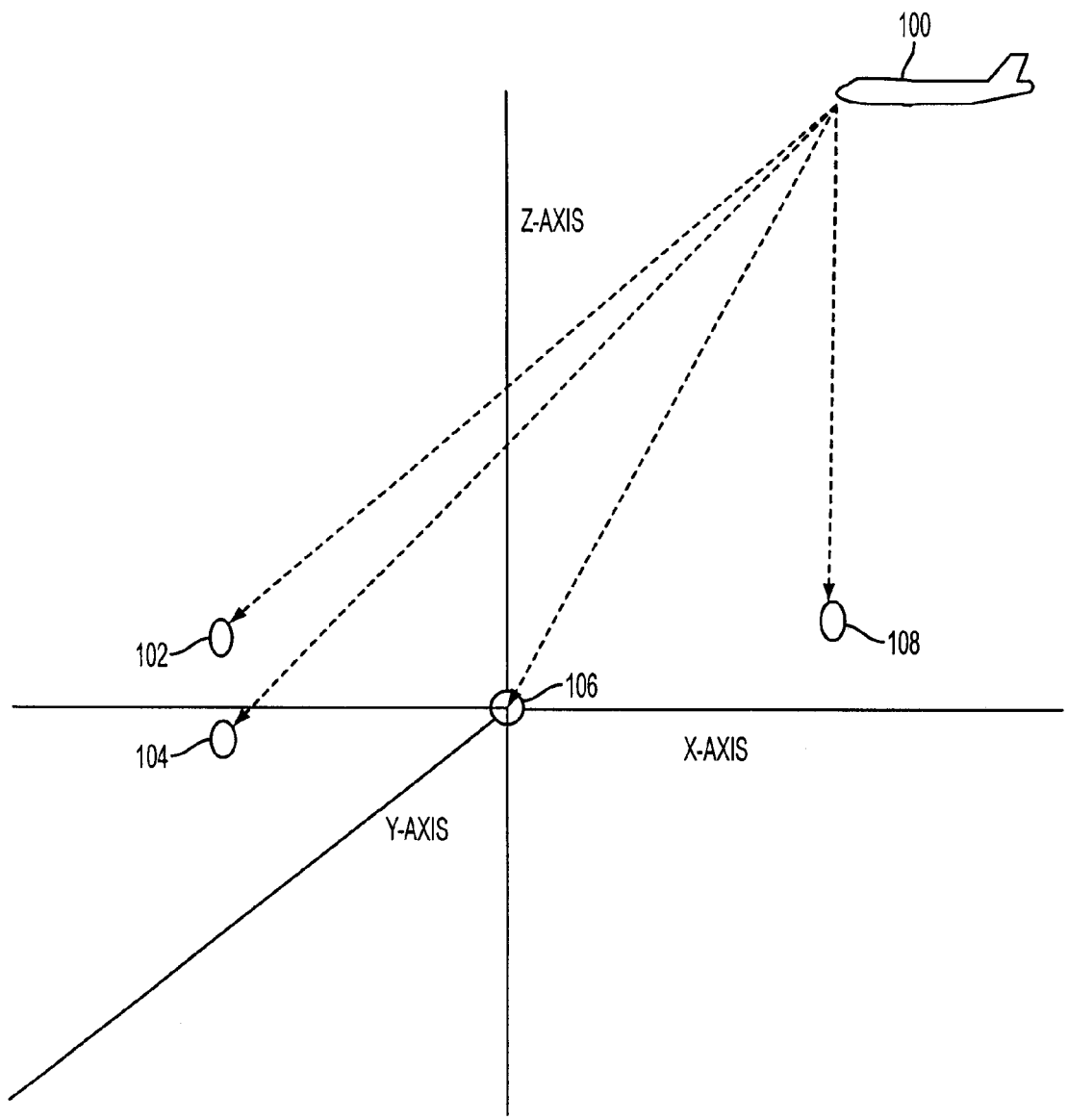
FIG. 1 is a schematic diagram showing an airborne object and a number of ground-based sensors according to some embodiments of the invention.

As schematically indicated in FIG. 1, object 100 may comprise an aircraft, however, the invention is not so limited. Object 100 may comprise any object capable of being detected by the appropriate sensors (e.g., 102–108). For example, object 100 may comprise aircraft, missiles, spacecraft (e.g., space shuttles, satellites, etc.), land vehicles, watercraft, or the like. In addition, object 100 may comprise any type of electronic device capable of being detected by appropriate sensors (e.g., 102–108). For example, object 100 may comprise cellular telephones, paging devices, GPS receivers, wireless radio transmitters, or the like.

Similarly, while four sensors are shown in FIG. 1, the invention is not so limited. Any number of sensors may be used as is appropriate. In addition, the type of sensor may depend upon the type of position determining system being employed. For example, position determining systems like radar, sonar, GPS, cellular, etc., each employ appropriate types of sensors to detect the relevant signals.

It is also possible to practice the claimed invention in other configurations than the one shown in FIG. 1. For example, and as discussed in detail below, more or less sensors 102–108 may be employed in a variety of configurations. In addition, it is possible to use a mobile object location system wherein the system is contained, at least in part, in a spacecraft, aircraft, watercraft, or land-vehicle (e.g., MILSTAR satellite, AWACS or JSTARS aircraft, or similar ship-based or vehicle-based systems).

Figure 2:
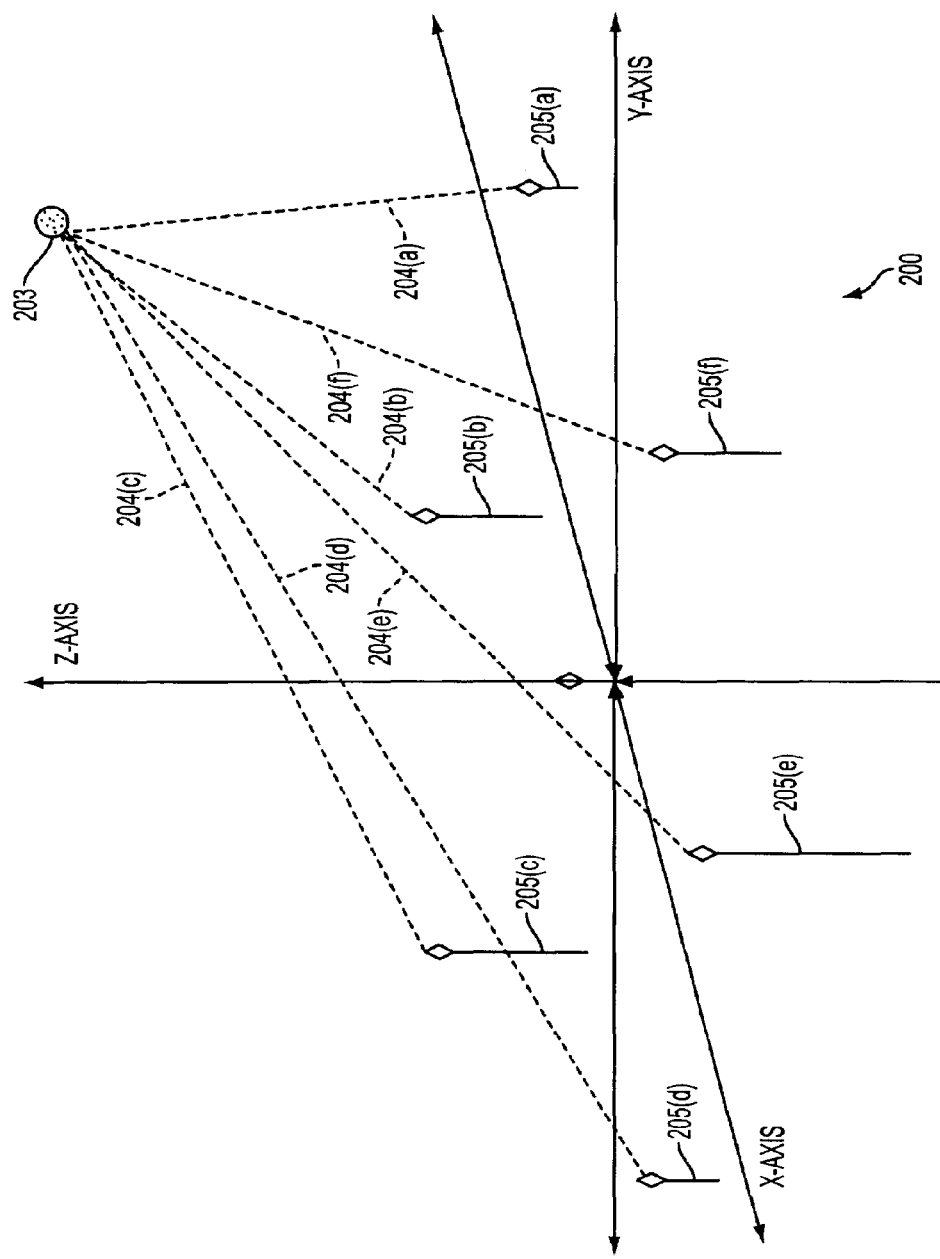
FIG. 2 is a three-dimensional schematic diagram showing an object and a number of sensors according to some embodiments of the invention.

FIG. 2 is a schematic depiction of an object position detection system according to some embodiments of the invention. As shown in FIG. 2, system 200 may be configured in a 3-dimensional rectangular coordinate system. System 200 may comprise a number, M, of sensors arranged at differing axis coordinates. As shown in FIG. 2, for some embodiments it is preferable to use six sensors, 205(a), 205(b), 205(c), 205(d), 205(e), 205(f), positioned at various locations.

In operation, a transmitted, or reflected signal (not shown) from the object 203 is received by each of the sensors, 205(a), 205(b), 205(c), 205(d), 205(e), 205(f). In some embodiments, the time of arrival (TOA) for the signal from the object to each sensor is recorded for later use in processing. Assuming that the time of transmission, or reflection, from the object is also known, a slant range (i.e., the line of sight distance between two points, not at the same level relative to a specific datum) 204(a), 204(b), 204(c), 204(d), 204(e), 204(f) from the object 203 to each of the sensor 205(a), 205(b), 205(c), 205(d), 205(e), 205(f) can be calculated in the following manner:

$$sr\_0_{in} = c(t\_0_{in} - t_{tgt}) \quad (1)$$

for in=1, ..., M where $sr\_0_{in}$=Slant range between each sensor in and object, $t\_0_{in}$=Time of arrival, $t_{tgt}$=Time of transmission or reflection, c=Speed of light.

An example of a slant range can be described with reference to the example of an airborne radar object (e.g., an airplane flying at high altitude with respect to a radar antenna). In that example, the slant range is the hypotenuse of the triangle represented by the altitude of the airplane and the distance between the radar antenna and the airplane's ground track.

Figure 22:
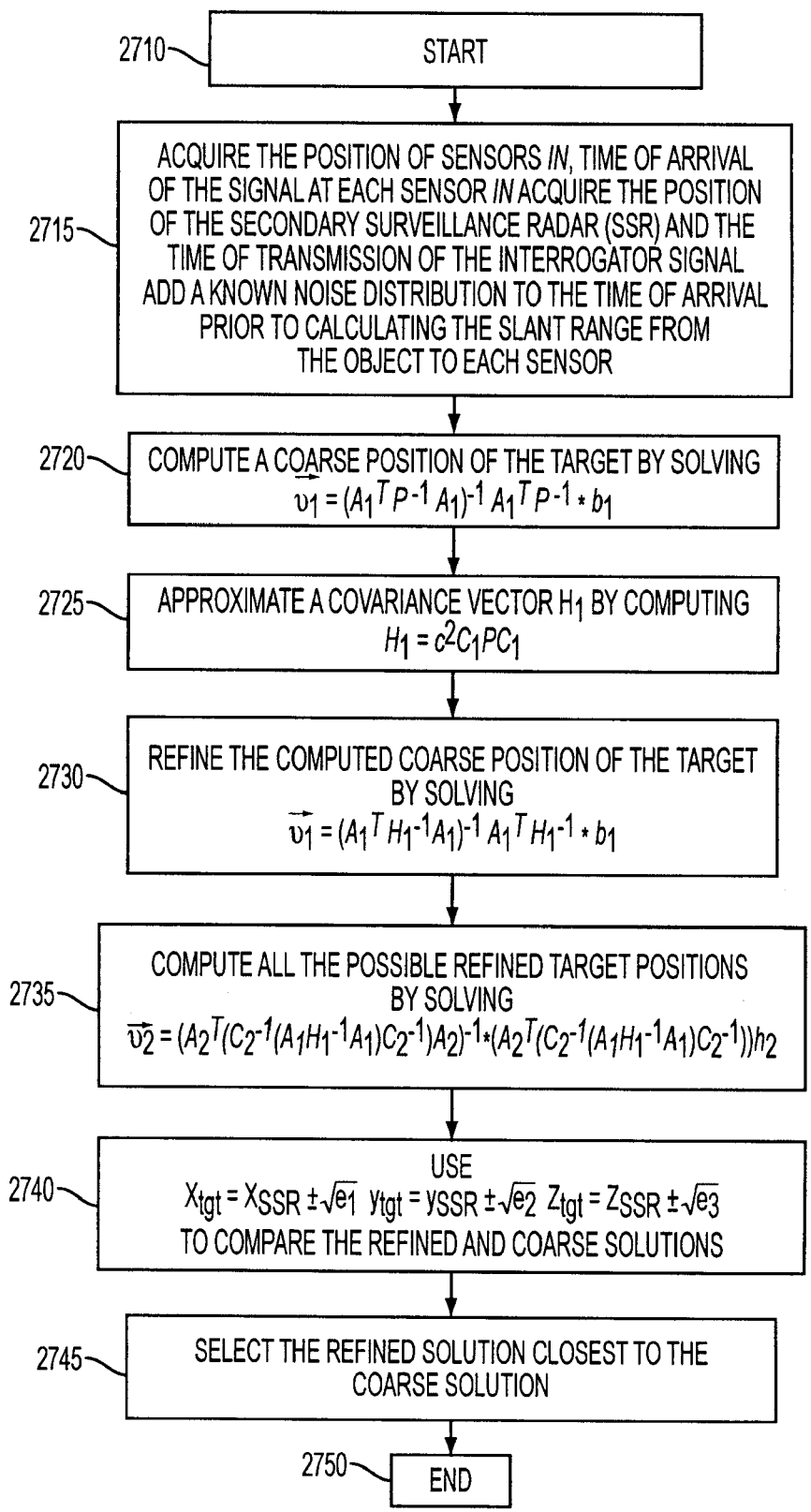
FIG. 22 is a schematic flow diagram of a method for computing object position adding a known noise distribution to the TOA in accordance with some embodiments of the invention.

Because of possible delays and noise contamination of the received signal at each of the sensors 205(a), 205(b), 205(c), 205(d), 205(e), 205(f), errors may occur that may skew the accuracy of the TOA of the signal at each sensor. Therefore, in order to compensate for such an error, a known noise distribution (e.g., Gaussian noise) may be added to the TOA, yielding:

$$t_{in} = t\_0_{in} + N(\sigma_t) \quad (2)$$

where $N(\sigma)$ denotes a Gaussian random number with variance of $\sigma^2$. This is depicted in FIG. 22, step 2715.

The slant range between sensor in and the object 203, with the added noise, may be determined by subtracting the TOA of the transmitted or reflected signal from object 203 to the already known time of transmission or reflection of the signal from the object 203 and multiplying it with the velocity of the signal (e.g., the speed of light (c)), yielding:

$$r_{in} = c(t_{in} - t_{tgt}) \quad (3)$$

$$r_{in} = c(t\_0_{in} + N(\sigma_t) - t_{tgt})$$

$$r_{in} = c(t\_0_{in} - t_{tgt}) + cN(\sigma_1)$$

$$r_{in} = sr\_0_n + N(\sigma_r) \text{ where } \sigma_r = c\sigma_1.$$

A position vector $\vec{P}_{tgt} = [x_{tgt} y_{tgt} z_{tgt}]^T$ of the object 203 maybe calculated based on the TOA of the reflected or transmitted signal at each sensor $t_{in}$, the slant range from the object to each sensor $sr_{in}$ and the known position of each sensor (i.e., the determinable position vector $\vec{P}s_{in}$ of each of the M sensors in the coordinate system)

$$\vec{P}s_{in} = \begin{bmatrix} x_{in} \\ y_{in} \\ z_{in} \end{bmatrix} \text{ for}$$

$in = 1, \ldots, M$.

In some embodiments, a Lorentz inner product is used to calculate object position based on TOA information. Following that procedure, let $\vec{v}_1$ and $\vec{v}_2$ be a pair of 4-element vectors:

$$\vec{v}_1 = \begin{bmatrix} x_1 \\ y_1 \\ z_1 \\ w_1 \end{bmatrix}, \vec{v}_2 = \begin{bmatrix} x_2 \\ y_2 \\ z_2 \\ w_2 \end{bmatrix}.$$

Then, Lorentz inner product is then defined as $$\langle \vec{v}_1, \vec{v}_2 \rangle_L = x_1 x_2 + y_1 y_2 + z_1 z_2 - w_1 w_2.$$

For each sensor in, the slant range can be expressed the following way:

$$rd_{in}^2 = c^2(t_{in} - t_{tgt})^2 = \|\vec{P}s_{in} - \vec{P}_{tgt}\|^2 = (x_{in} - x_{tgt})^2 + (y_{in} - y_{tgt})^2 + (z_{in} - z_{tgt})^2,$$

or $$(x_{in} - x_{tgt})^2 + (y_{in} - y_{tgt})^2 + (z_{in} - z_{tgt})^2 - c^2(t_{in} - t_{tgt})^2 = 0.$$

Reorganizing the equation gives:

$$2x_{in}x_{tgt} + 2y_{in}y_{tgt} + 2z_{in}z_{tgt} - 2c t_{in} t_{tgt} = (x_{tgt}^2 + y_{tgt}^2 + z_{tgt}^2 - c^2 t_{tgt}^2) + (x_{in}^2 + y_{in}^2 + z_{in}^2 - c^2 t_{in}^2).$$

Let $\lambda = x_{tgt}^2 + y_{tgt}^2 + z_{tgt}^2 - c^2 t_{tgt}^2$, and organize the equations $in = 1, \ldots, M$ as a linear system so that $$2 \cdot A \cdot \vec{v} = \lambda \cdot I\_v + \vec{b}$$

where $$A = \begin{bmatrix} x_1 & y_1 & z_1 & -ct_1 \\ \vdots & \vdots & \vdots & \vdots \\ x_{in} & y_{in} & z_{in} & -ct_{in} \\ \vdots & \vdots & \vdots & \vdots \\ x_M & y_M & z_M & -ct_M \end{bmatrix},$$

$$\vec{v} = \begin{bmatrix} x_{tgt} \\ y_{tgt} \\ z_{tgt} \\ ct_{tgt} \end{bmatrix},$$

$$I\_v = \begin{bmatrix} 1 \\ \vdots \\ 1 \\ \vdots \\ 1 \end{bmatrix},$$

$$\vec{b} = \begin{bmatrix} x_1^2 + y_1^2 + z_1^2 - c^2 t_1^2 \\ \vdots \\ x_{in}^2 + y_{in}^2 + z_{in}^2 - c^2 t_{in}^2 \\ \vdots \\ x_M^2 + y_M^2 + z_M^2 - c^2 t_M^2 \end{bmatrix}$$

Depending on the value of M, the matrix A may or may not be a square matrix. Assuming that $M \geq 4$, the method of least squares is applied by multiplying both sides with $A^T$ so that $$2 A^T A \vec{v} = \lambda A^T I\_v + A^T \vec{b}$$

$$\vec{v} = \frac{1}{2}(A^T A)^{-1} A^T I\_v \cdot \lambda + \frac{1}{2}(A^T A)^{-1} A^T \vec{b}$$

$$= \vec{d}\lambda + \vec{e}$$

where $$\vec{d} = \frac{1}{2}(A^T A)^{-1} A^T I\_v,$$

$$\vec{e} = \frac{1}{2}(A^T A)^{-1} A^T \vec{b}.$$

Taking the Lorentz inner product of $\vec{v}$ with itself gives $$\lambda = x_{tgt}^2 + y_{tgt}^2 + z_{tgt}^2 - c^2 t_{tgt}^2$$

$$= \langle \vec{v}, \vec{v} \rangle_L$$

$$= \langle \vec{d} \cdot \lambda + \vec{e}, \vec{d} \cdot \lambda + \vec{e} \rangle_L$$

$$\lambda = \langle \vec{d}, \vec{d} \rangle_L \lambda^2 + 2\langle \vec{d}, \vec{e} \rangle_L \lambda + \langle \vec{e}, \vec{e} \rangle_L.$$

This results in a quadratic equation with respect to $\lambda$:

$$\langle \vec{d}, \vec{d} \rangle_L \lambda^2 + (2\langle \vec{d}, \vec{e} \rangle_L - 1)\lambda + \langle \vec{e}, \vec{e} \rangle_L = 0.$$

Solving for $\lambda$ gives $$\lambda_\pm = \frac{-(2\langle \vec{d}, \vec{e} \rangle_L - 1) \pm \sqrt{(2\langle \vec{d}, \vec{e} \rangle_L - 1)^2 - 4\langle \vec{d}, \vec{d} \rangle_L \langle \vec{e}, \vec{e} \rangle_L}}{2\langle \vec{d}, \vec{d} \rangle_L}.$$

Once $\lambda$ is calculated, $\vec{v}$ is obtained by $$\begin{bmatrix} x_{tgt_\pm} \\ y_{tgt_\pm} \\ z_{tgt_\pm} \\ c \cdot t_{tgt_\pm} \end{bmatrix} = \vec{v}_\pm = \vec{d} \cdot \lambda_\pm + \vec{e}.$$

Now, two possible positions of the object are given by this computation. In order to choose the right solution, the following vectors are computed:

$$r\_ch_{\pm} = \begin{bmatrix} \|\vec{P}_{S_1} - \vec{P}_{tgt_{\pm}}\| \\ \vdots \\ \|\vec{P}_{S_{in}} - \vec{P}_{tgt_{\pm}}\| \\ \vdots \\ \|\vec{P}_{S_M} - \vec{P}_{tgt_{\pm}}\| \end{bmatrix} - \begin{bmatrix} sr_1 \\ \vdots \\ sr_{in} \\ \vdots \\ sr_M \end{bmatrix}.$$

The vector with the smallest error norm of $r\_ch_{\pm}$ can be chosen as the correct position of the object.

Figure 3:
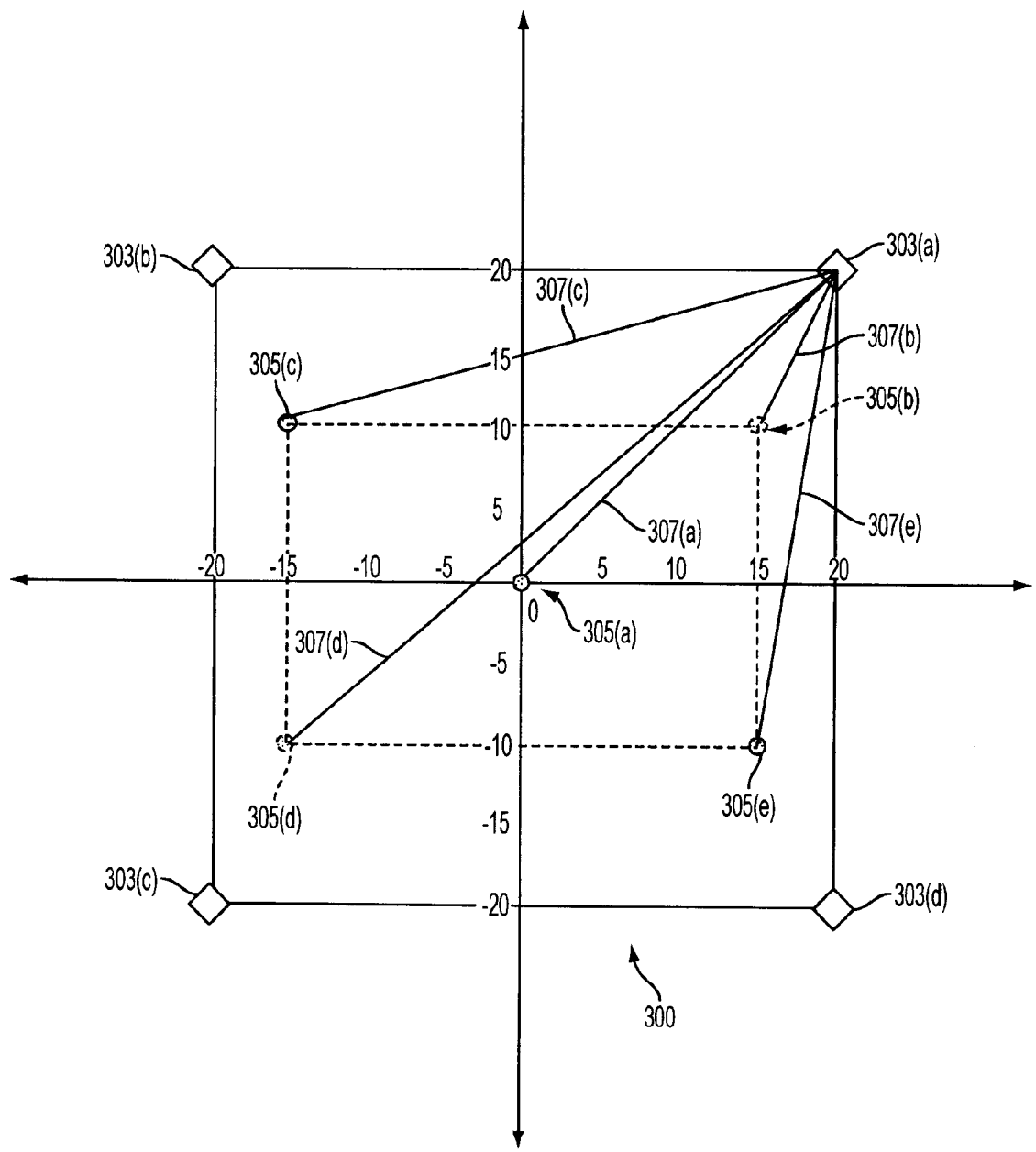
FIG. 3 is a two-dimensional schematic diagram showing an object with five sensors according to some embodiments of the invention.

An exemplary calculation of an object position vector is made with reference to FIG. 3. As shown in FIG. 3, a two-dimensional position location system 300, implementing a TOA based calculation, may comprise positioning four sensors $(S_1)$ 305(b), $(S_2)$ 305(c), $(S_3)$ 305(d), $(S_4)$ 305(e), and a reference sensor $(S_5)$ 305(a) in a 20×20 mile 2-dimensional grid at locations given by the following sensor position vectors:

$$\vec{P}_{S_1} = \begin{bmatrix} 15 \\ 10 \end{bmatrix}, \vec{P}_{S_2} = \begin{bmatrix} -15 \\ 10 \end{bmatrix},$$

$$\vec{P}_{S_3} = \begin{bmatrix} -15 \\ -10 \end{bmatrix}, \vec{P}_{S_4} = \begin{bmatrix} 15 \\ -10 \end{bmatrix},$$

$$\vec{P}_{S_5} = \begin{bmatrix} 0 \\ 0 \end{bmatrix}.$$

For calculation purposes, each grid node may be considered an object location. For each object position, the position vector calculation comprises estimating the position of the object for each sensor using slant range values at each sensor 305(b), 305(c), 305(d), 305(e), to compute the position of the object.

The above described system and TOA computation may be generalized so that it can be employed in a three dimensional (3-D) situation. In addition, the above system and TOA computation allows for the deployment of an unlimited number of sensors, so that a more accurate computation of the position of the object may be performed. Then, for each object position, the TOA computation may be used to estimate object position based on the noise added range data. In addition, a Monte-Carlo approach (or other numerical approximation method) may be employed to compute the standard deviation of the error between the true position of the object and the estimated position of the object. The standard deviation of Gaussian error added to the range may be $\sigma_r = 2.24 \times 10^{-3}$, or some other suitable value.

Proceeding with the calculations for each of the sensors sensor 305(a), 305(b), 305(c), 305(d), 305(e), the slant range in can be expressed as:

$$sr^2_{in} = c^2(t_{in} - t_{tgt})^2 \quad (5)$$

In terms of the positions of each sensor 305(a), 305(b), 305(c), 305(d), 305(e) and the position of the object at each position 303(a), 303(b), 303(c), 303(d), slant ranges 307(a), 307(b), 307(c), and 307(d) may be determined using the following relationship:

$$sr^2_{in} = \|\vec{P}_{S_{in}} - \vec{P}_{tgt}\|^2$$

$$sr^2_{in} = (x_{in} - x_{tgt})^2 + (y_{in} - y_{tgt})^2 + (z_{in} - z_{tgt})^2 \quad (6)$$

In other words, equation (6) may be re-written as:
$(x_{in} - x_{tgt})^2 + (y_{in} - y_{tgt})^2 + (z_{in} - z_{tgt})^2 - c^2(t_{in} - t_{tgt})^2 = 0$, and reorganizing the equation yields, $$2x_{in}x_{tgt} + 2y_{in}y_{tgt} + 2z_{in}z_{tgt} - 2ct_{in}t_{tgt} = (x_{tgt}^2 + y_{tgt}^2 + z_{tgt}^2 - c^2 t_{tgt}^2) + (x_{in}^2 + y_{in}^2 + z_{in}^2 - c^2 t_{in}^2) \quad (7)$$

letting: $\lambda = x_{tgt}^2 + y_{tgt}^2 + z_{tgt}^2 - c^2 t_{tgt}^2$ which is a Lorentz invariant, and organizing equation (7) for in=1, ... M, above as a linear system, it becomes, $$2 \cdot A \cdot \vec{v} = \lambda \cdot I\_v + \vec{b} \quad (8)$$

where, $$A = \begin{bmatrix} x_1 & y_1 & z_1 & -ct_1 \\ \vdots & \vdots & \vdots & \vdots \\ x_{in} & y_{in} & z_{in} & -ct_{in} \\ \vdots & \vdots & \vdots & \vdots \\ x_M & y_M & z_M & -ct_M \end{bmatrix},$$

$$\vec{v} = \begin{bmatrix} x_{tgt} \\ y_{tgt} \\ z_{tgt} \\ ct_{tgt} \end{bmatrix},$$

$$I\_v = \begin{bmatrix} 1 \\ \vdots \\ 1 \\ \vdots \\ 1 \end{bmatrix},$$

$$\vec{b} = \begin{bmatrix} x_1^2 + y_1^2 + z_1^2 - c^2 t_1^2 \\ \vdots \\ x_{in}^2 + y_{in}^2 + z_{in}^2 - c^2 t_{in}^2 \\ \vdots \\ x_M^2 + y_M^2 + z_M^2 - c^2 t_M^2 \end{bmatrix}$$

and depending on the value of M, the matrix A may or may not be a square matrix. Assuming that $M \geq 4$, the method of least squares may be applied by multiplying the transpose of A($A^T$) by both sides of equation (8) above, yielding:

$$2A^T A \vec{v} = \lambda A^T I\_v + A^T \vec{b} \quad (9)$$

solving for $\vec{v}$, $$\vec{v} = \frac{1}{2}(A^T A)^{-1} A^T I\_v \cdot \lambda + \frac{1}{2}(A^T A)^{-1} A^T \vec{b}$$

$$\vec{v} = \vec{d} \lambda + \vec{e} \quad (10)$$

where, $$\vec{d} = \frac{1}{2}(A^T A)^{-1} A^T I\_v \text{ and } \vec{e} = \frac{1}{2}(A^T A)^{-1} A^T \vec{b}$$

Taking a Lorentz inner product of $\vec{v}$ with itself gives, $$\lambda = \langle \vec{v}, \vec{v} \rangle_L$$

$$\lambda = \langle \vec{d} \cdot \lambda + \vec{e}, \vec{d} \cdot \lambda + \vec{e} \rangle_L \quad (11)$$

$\lambda = \langle \vec{d}, \vec{d} \rangle_L \lambda^2 + 2 \langle \vec{d}, \vec{e} \rangle_L \lambda + \langle \vec{e}, \vec{e} \rangle_L$, this results in a quadratic equation with respect to $\lambda$, yielding $$\langle \vec{d}, \vec{d} \rangle_L \lambda^2 + (2 \langle \vec{d}, \vec{e} \rangle_L - 1) \lambda + \langle \vec{e}, \vec{e} \rangle_L = 0 \quad (12)$$

solving for λ yields, $$\lambda_{\pm} = \frac{-(2\langle \vec{d}, \vec{e}\rangle_L - 1) \pm \sqrt{(2\langle \vec{d}, \vec{e}\rangle_L - 1)^2 - 4\langle \vec{d}, \vec{d}\rangle_L \langle \vec{e}, \vec{e}\rangle_L}}{2\langle \vec{d}, \vec{d}\rangle_L} \quad (13)$$

From the quadratic equation above, λ can be calculated, and hence, $\vec{v}$ can be obtained by $$\begin{bmatrix} x_{tgt_{\pm}} \\ y_{tgt_{\pm}} \\ z_{tgt_{\pm}} \\ c \cdot t_{tgt_{\pm}} \end{bmatrix} = \vec{v}_{\pm} = \vec{d} \cdot \lambda_{\pm} + \vec{e}.$$

Because λ yields two values from the solution of equation (13), which are two possible positions of the object, therefore, in order to ascertain the correct position of the object, the following vectors may be computed:

$$r\_ch_{\pm} = \begin{bmatrix} \|\vec{P}_{S_1} - P_{tgt_{\pm}}\| \\ \vdots \\ \|\vec{P}_{S_{in}} - P_{tgt_{\pm}}\| \\ \vdots \\ \|\vec{P}_{S_M} - P_{tgt_{\pm}}\| \end{bmatrix} - \begin{bmatrix} sr_1 \\ \vdots \\ sr_{in} \\ \vdots \\ sr_M \end{bmatrix}$$

From the computation above, the vector with the smallest error norm of $r\_ch_{\pm}$ may be chosen to be the correct position of the object.

Figure 4:
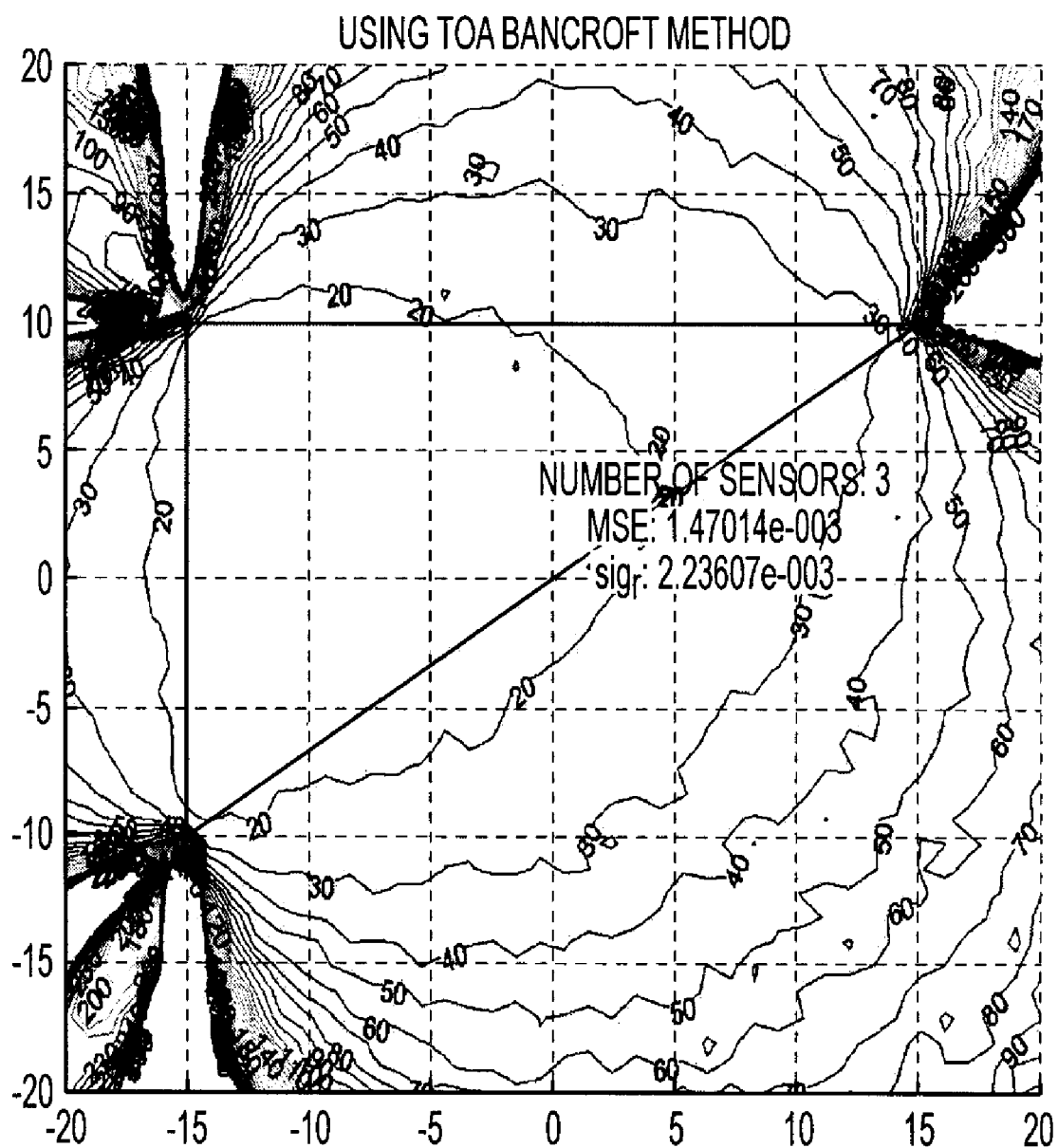
FIG. 4 is a plot of TOA computation error contours with three sensors according to one embodiment of the invention.

FIG. 4 is a contour plot of the standard deviation of the resulting error for three sensors used in determining the location of an object according to some embodiments of the invention. Likewise, FIG. 5 is a contour plot of the standard deviation of the resulting error for four sensors used in determining the location of an object according to some embodiments of the invention and FIG. 6 is a contour plot of the standard deviation of the resulting error for five sensors used in determining the location of an object according to some embodiments of the invention.

Figure 5:
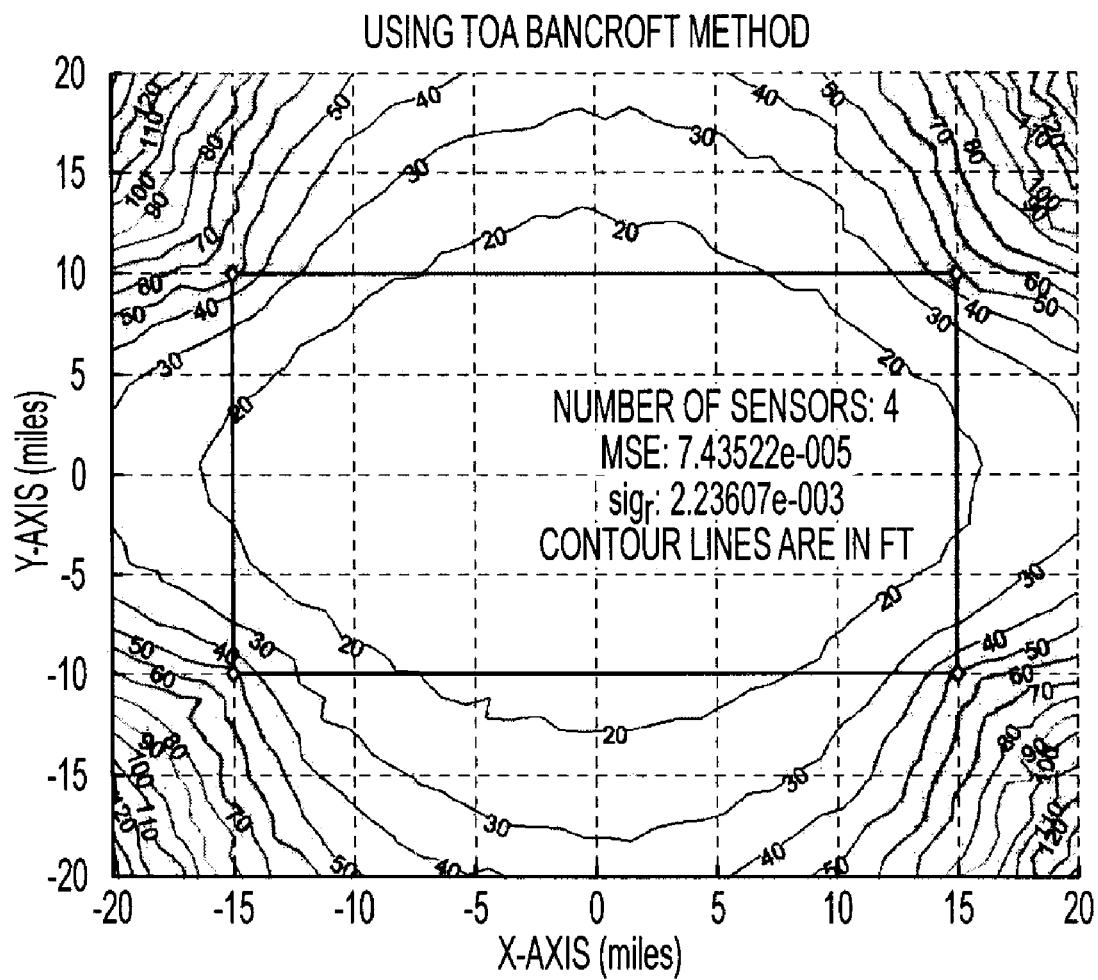
FIG. 5 is a plot of TOA computation error contours with four sensors according to one embodiment of the invention.
Figure 6:
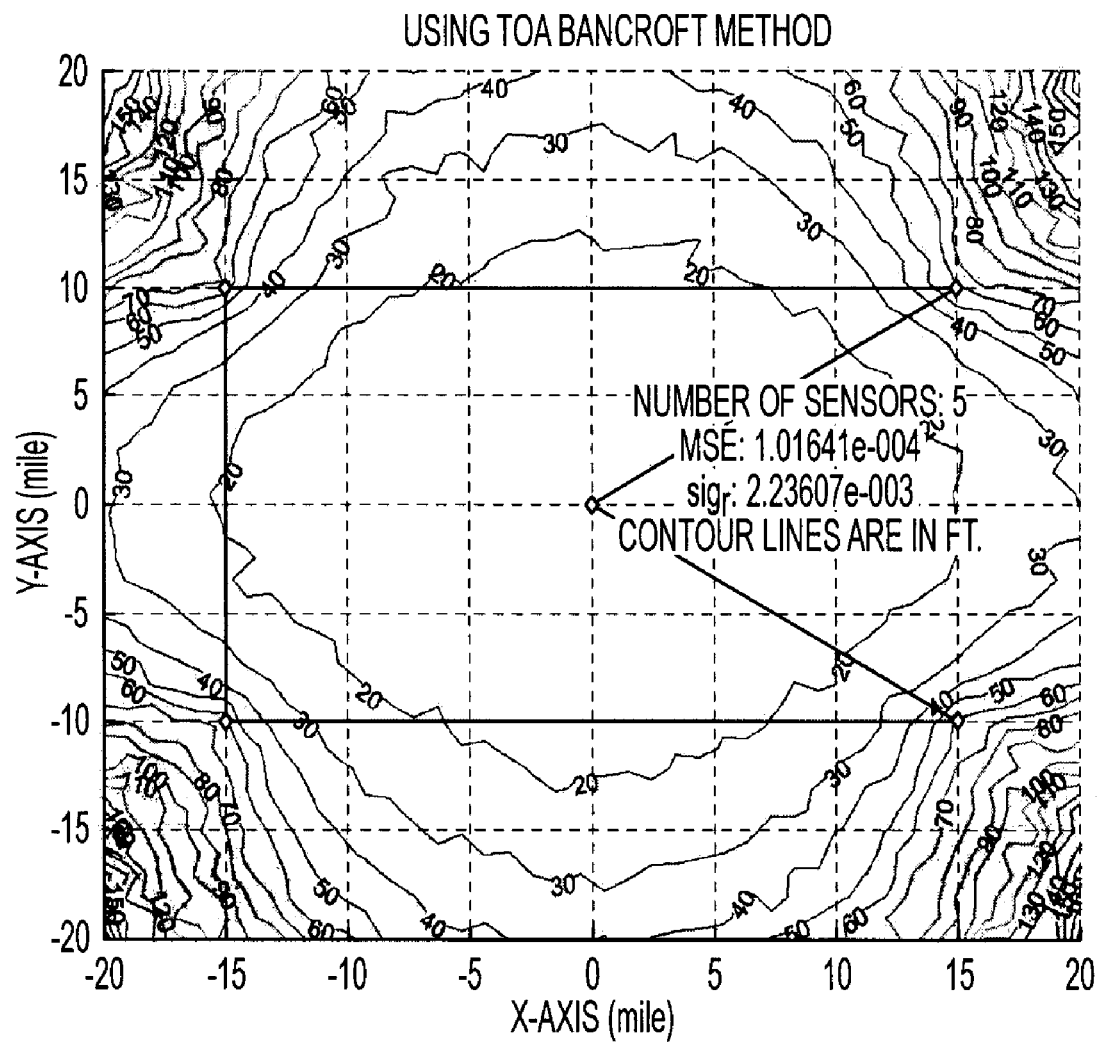
FIG. 6 is a plot of TOA computation error contours with five sensors according to one embodiment of the invention.

As can be seen from FIGS. 4–6, the error is relatively small inside the sensor configuration, and it becomes larger for objects positioned away from the center. In particular, FIG. 4 demonstrates that the error values are particularly large along the rays that are collinear to the line segments connecting sensor pairs. One reason for this large error may be that the discriminant in the quadratic expression of λ is zero or nearly zero, and that may contribute to large errors in the calculation. Another inference that can be surmised from FIGS. 4–6 is that adding more sensors dramatically improves the accuracy of the position determination.

Figure 7:
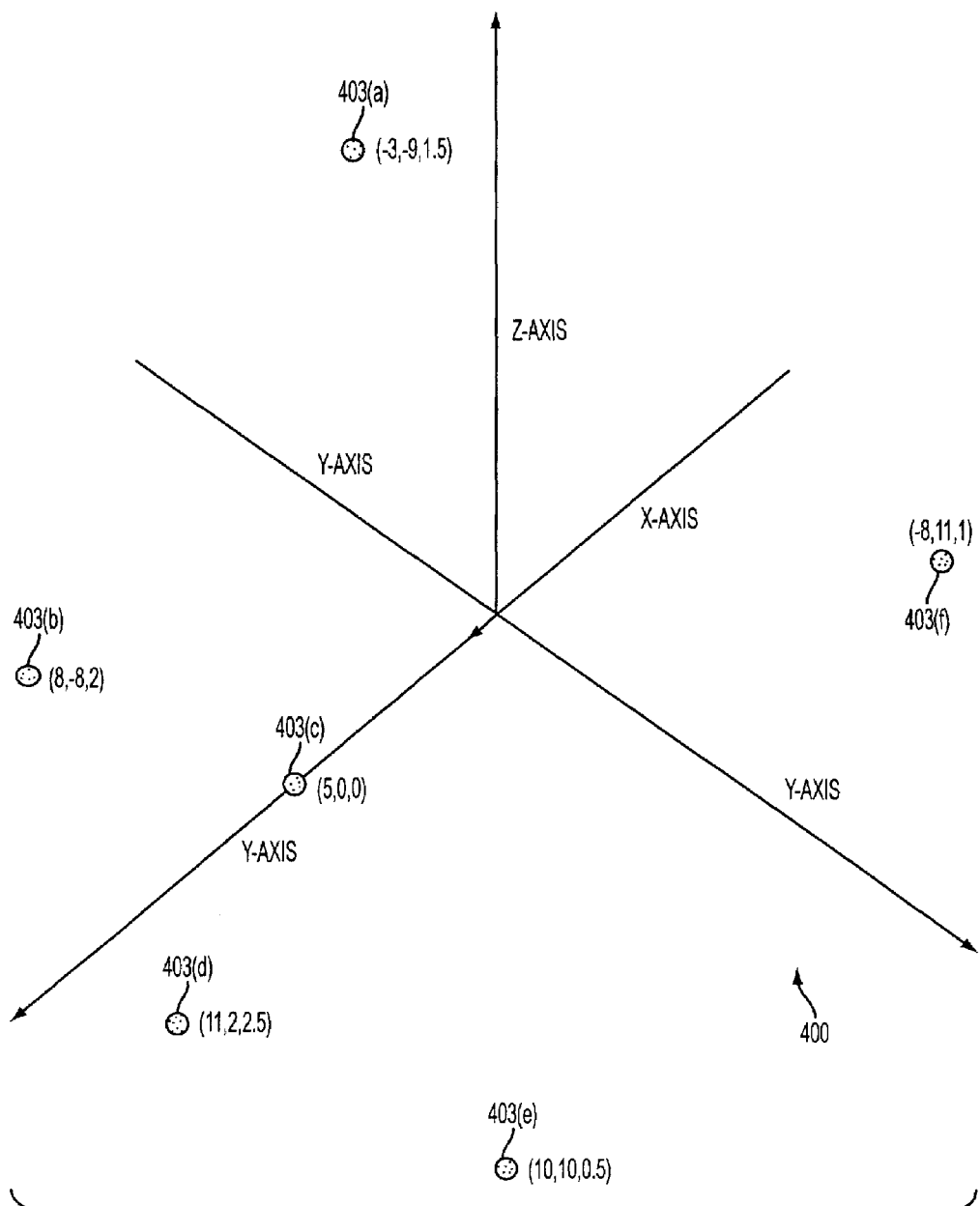
FIG. 7 is a three-dimensional TOA schematic diagram showing an object with five ground-based sensors according to one embodiment of the present invention.

Another exemplary embodiment of the invention is discussed with reference to FIG. 7. FIG. 7 is a schematic diagram of another embodiment of position location system 400 using a 3-dimensional coordinate system to implement a TOA computation. As shown, this embodiment may comprise positioning six sensors 405(*a*), 405(*b*), 405(*c*), 405(*d*), 405(*e*), and 405(*f*) in a 20×20 mile grid at the following position vector locations:

$$\vec{P}_{S_1} = \begin{bmatrix} 5 \\ 0 \\ 0 \end{bmatrix}, \vec{P}_{S_2} = \begin{bmatrix} 10 \\ 10 \\ 0.5 \end{bmatrix},$$

$$\vec{P}_{S_3} = \begin{bmatrix} -8 \\ 11 \\ 1 \end{bmatrix}, \vec{P}_{S_4} = \begin{bmatrix} -3 \\ -9 \\ 1.5 \end{bmatrix},$$

$$\vec{P}_{S_5} = \begin{bmatrix} 8 \\ -8 \\ 2 \end{bmatrix}, \vec{P}_{S_6} = \begin{bmatrix} 11 \\ 2 \\ 2.5 \end{bmatrix}.$$

discussed above, for calculation purposes, each grid node may be considered to be an object position. For each object position, an estimate of the position of the object for each sensor may be performed by using slant range values at each sensor 405(*a*), 405(*b*), 405(*c*), 405(*d*), 405(*e*), and 405(*f*). Then, a similar calculation as above is used to estimate object position based on the noise added range data.

FIGS. 8–13, are schematic representations of results of the calculation for each grid node presented in terms of a line segment connecting a true position of the object represented by a circle, and a simulated position of the object, represented by an 'x' symbol, so that the greater the segment length connecting the two points, the worse the error. In other words, where the circle and the x coincide (e.g., ⓧ) there is relatively small error.

Figure 8:
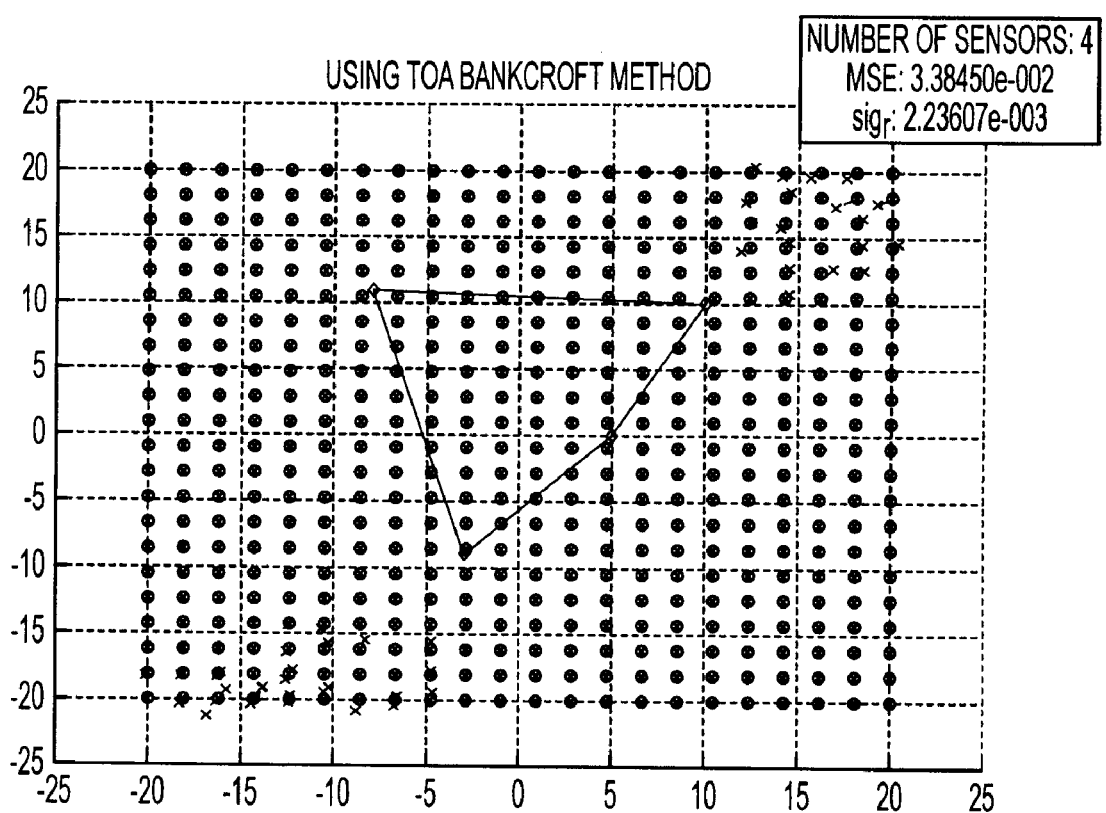
FIG. 8 is a top-view of an error result for a three-dimensional TOA-based computation with four sensors in accordance with some embodiments of the invention.
Figure 9:
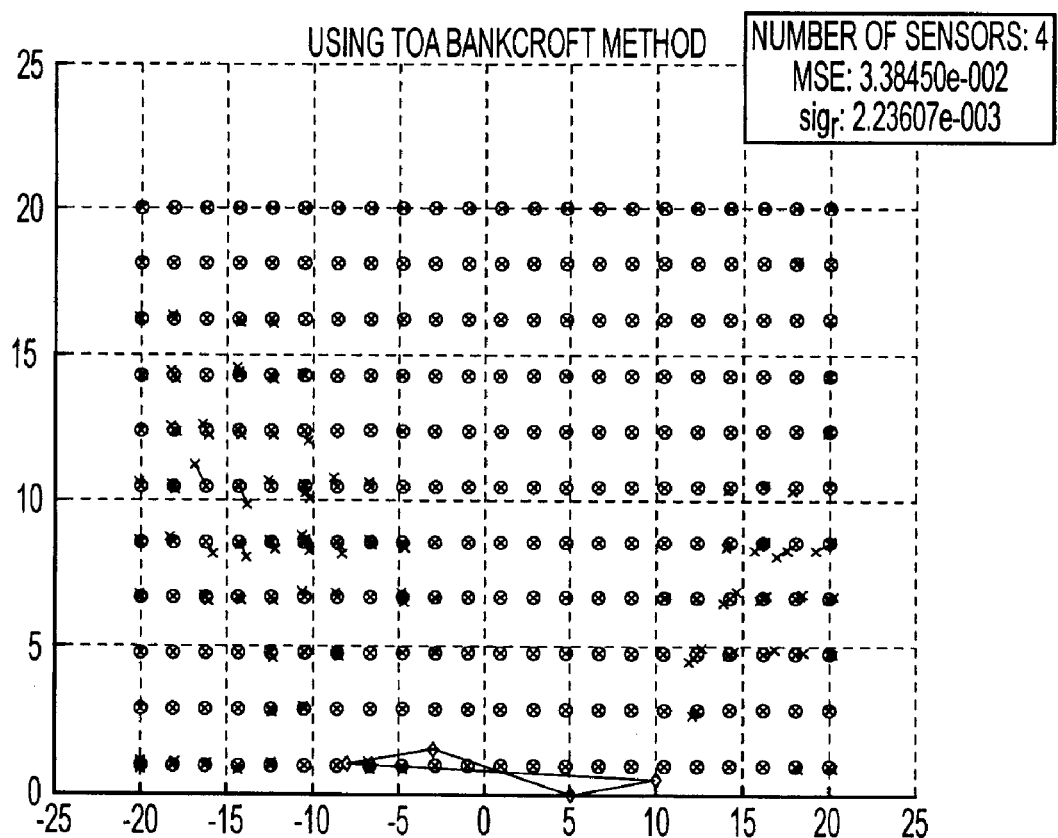
FIG. 9 is a side-view of an error result for a three-dimensional TOA-based computation with four sensors in accordance with some embodiments of the invention.

FIG. 8 is a schematic representation of the above described error plot for a three dimensional case using four sensors and viewed from the top. FIG. 9 is a schematic of the same three dimensional, four sensor plot as FIG. 8, except the view is from the side.

Figure 10:
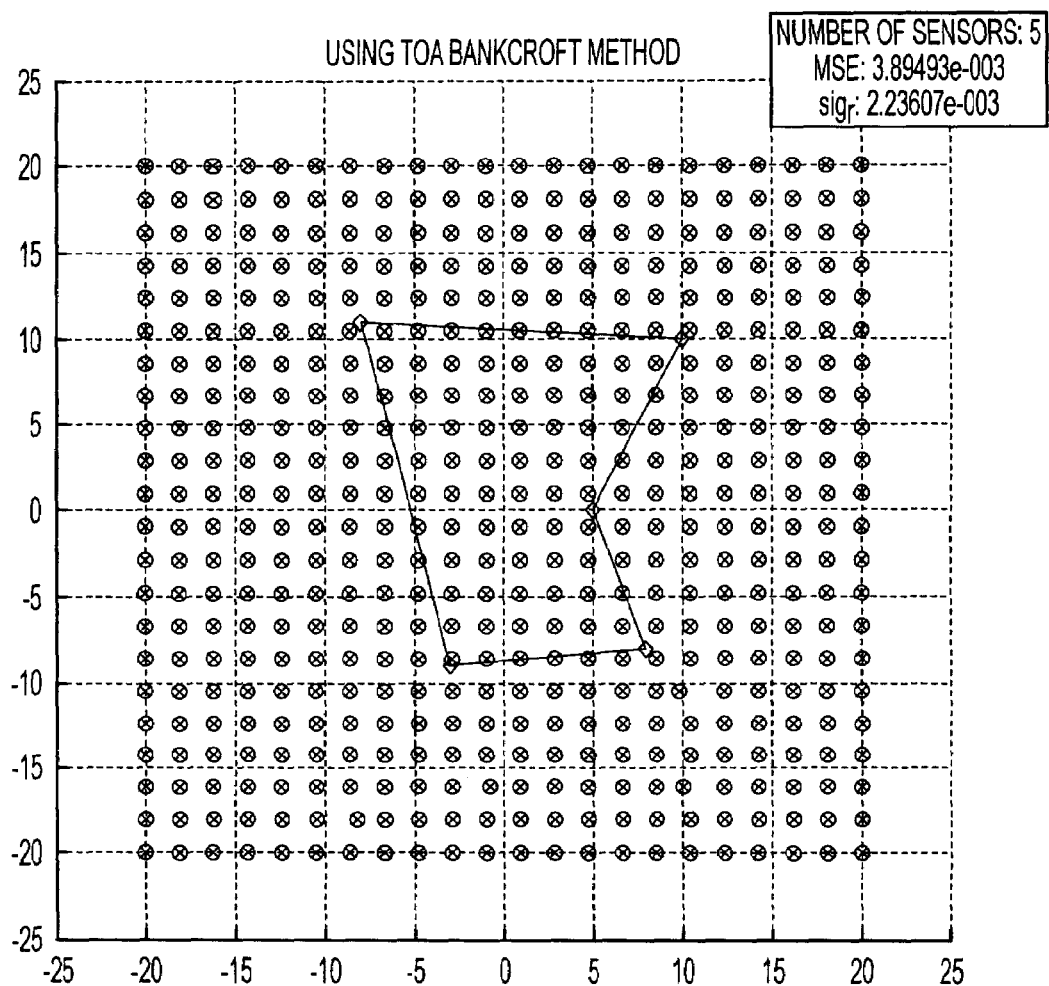
FIG. 10 is a top-view of an error result for a three-dimensional TOA-based computation with five sensors in accordance with some embodiments of the invention.
Figure 11:
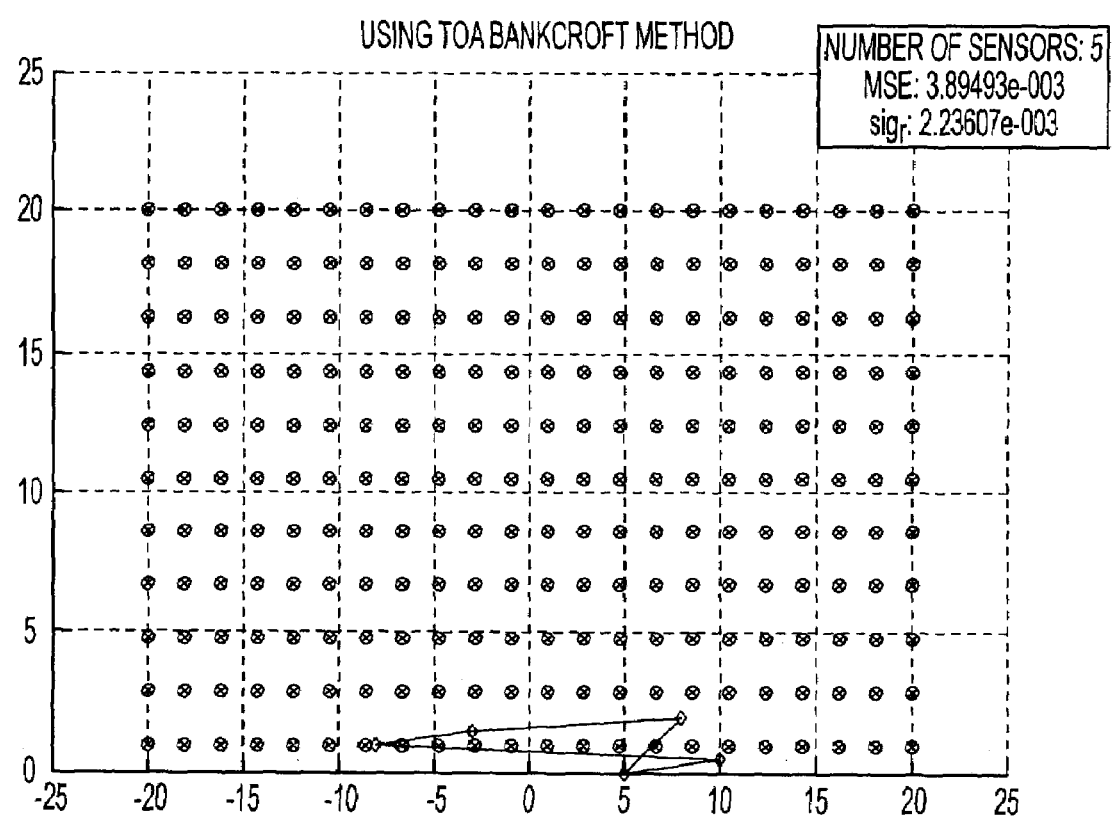
FIG. 11 is a side-view of an error result for a three-dimensional TOA-based computation with five sensors in accordance with some embodiments of the invention.

FIG. 10 is a schematic representation of the above described error plot for a three dimensional case using five sensors and viewed from the top. FIG. 11 is a schematic of the same three dimensional, five sensor plot as FIG. 10, except the view is from the side.

Figure 12:
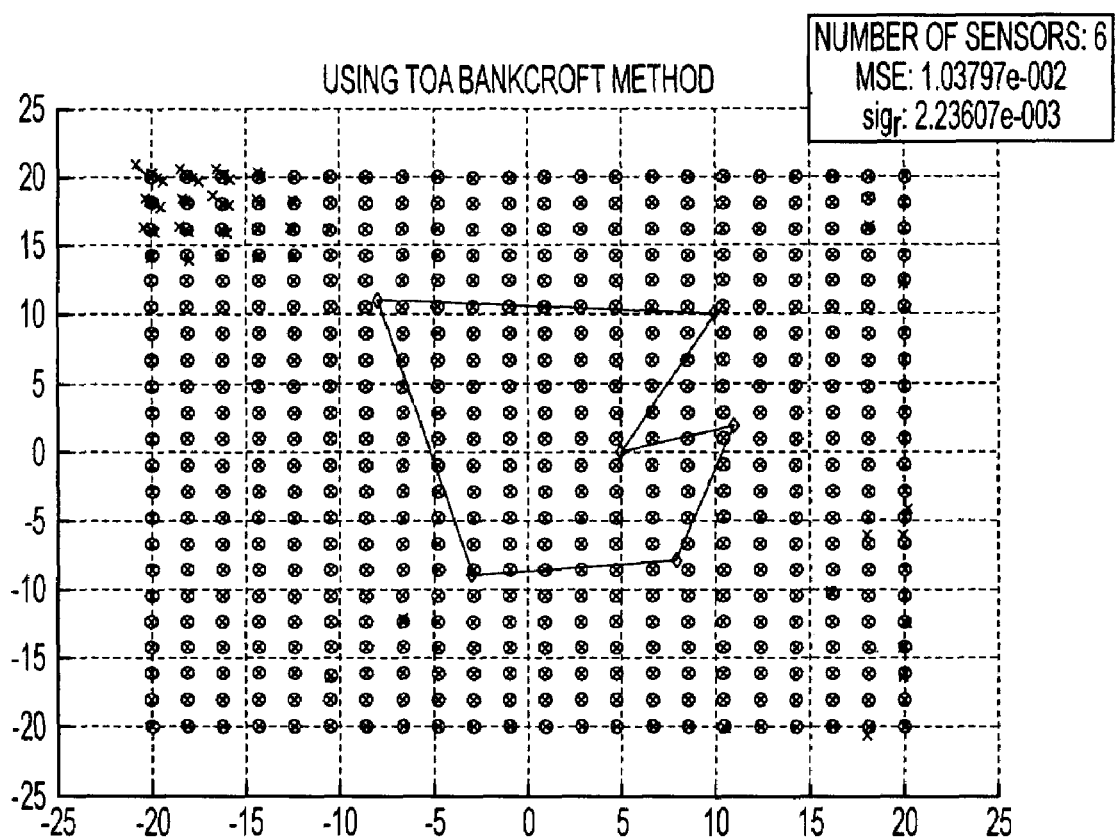
FIG. 12 is a top-view of an error result for a three-dimensional TOA-based computation with six sensors in accordance with some embodiments of the invention.
Figure 13:
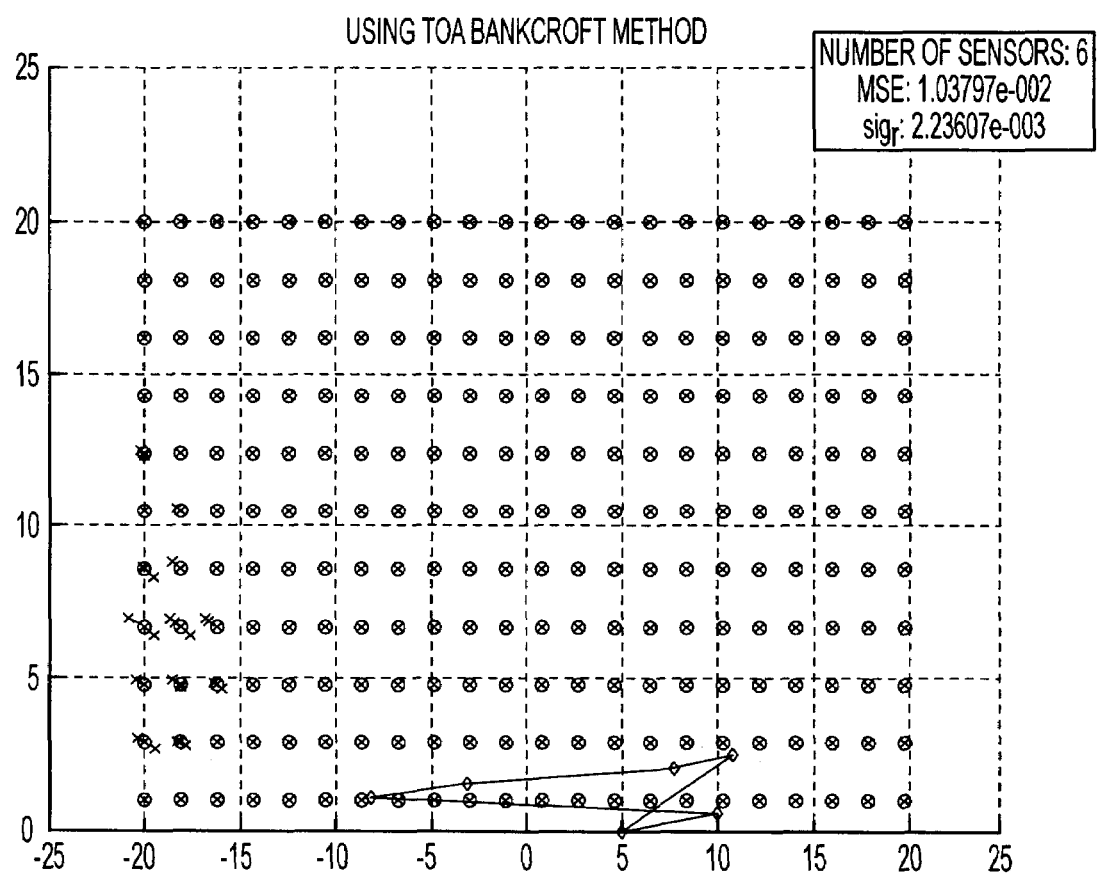
FIG. 13 is a side-view of an error result for a three-dimensional TOA-based computation with six sensors in accordance with some embodiments of the invention.

FIG. 12 is a schematic representation of the above described error plot for a three dimensional case using six sensors and viewed from the top. FIG. 13 is a schematic of the same three dimensional, six sensor plot as FIG. 12, except the view is from the side.

As demonstrated in FIGS. 8–13, the results of the position calculation for the above described TOA computation gives quite accurate results near the sensor positions. Away from the sensor positions, the results of the TOA computation are not as accurate. The trend in values of the mean squared error seems to indicate that adding more sensors may improve the accuracy, but not by too much because sensor positions along the z-axis may be limited by practical considerations.

Some embodiments of the invention may perform object position computation using a TDOA computation. Some methods of performing TDOA computations are known. For example, the above noted paper by Chan and Ho describes a TDOA calculation.

In contrast to the TOA computation, the TDOA computation uses the difference of the time of arrival at each sensor with respect to a reference sensor to compute the position of a object. Therefore, the set of equations to be solved is somewhat different. Also, the time of transmission or reflection may not be needed.

First, a description of a Taylor Series TDOA (TS-TDOA) method of computing object position is provided. Initially, the position of the object is such that $x_{tgt} = x_c + \Delta x$ $y_{tgt} = y_c + \Delta y$ $z_{tgt} = z_c + \Delta z.$ where $$G_{ts} = \begin{bmatrix} \frac{(x_1 - x_c)}{sr_{c\,1}} - \frac{(x_2 - x_c)}{sr_{c\,2}} & \frac{(y_1 - y_c)}{sr_{c\,1}} - \frac{(y_2 - y_c)}{sr_{c\,2}} & \frac{(z_1 - z_c)}{sr_{c\,1}} - \frac{(z_2 - z_c)}{sr_{c\,2}} \\ \vdots & \vdots & \vdots \\ \frac{(x_1 - x_c)}{sr_{c\,1}} - \frac{(x_{in} - x_c)}{sr_{c\,in}} & \frac{(y_1 - y_c)}{sr_{c\,1}} - \frac{(y_{in} - y_c)}{sr_{c\,in}} & \frac{(z_1 - z_c)}{sr_{c\,1}} - \frac{(z_{in} - z_c)}{sr_{c\,in}} \\ \vdots & \vdots & \vdots \\ \frac{(x_1 - x_c)}{sr_{c\,1}} - \frac{(x_M - x_c)}{sr_{c\,M}} & \frac{(y_1 - y_c)}{sr_{c\,1}} - \frac{(y_M - y_c)}{sr_{c\,M}} & \frac{(z_1 - z_c)}{sr_{c\,1}} - \frac{(z_M - z_c)}{sr_{c\,M}} \end{bmatrix},$$

$$\vec{v}_{ts} = \begin{bmatrix} \Delta x \\ \Delta y \\ \Delta z \end{bmatrix},$$

$$\vec{h}_{ts} = \begin{bmatrix} \text{sr\_n}_{2,1} - (sr_{c\,2} - sr_{c\,1}) \\ \text{sr\_n}_{in,1} - (sr_{c\,in} - sr_{c\,1}) \\ \text{sr\_n}_{M,1} - (sr_{c\,M} - sr_{c\,1}) \end{bmatrix}.$$

Then, the slant range equation for each in can be expanded as a Taylor series about $(x_c, y_c, z_c)$ so that $$sr_{in} = \sqrt{(x_{in} - x_{tgt})^2 + (y_{in} - y_{tgt})^2 + (z_{in} - z_{tgt})^2}$$

$$= \sqrt{(x_{in} - (x_c - \Delta x))^2 + (y_{in} - (y_c - \Delta y))^2 + (z_{in} - (z_c - \Delta z))^2}$$

$$\approx \sqrt{(x_{in} - x_c)^2 + (y_{in} - y_c)^2 + (z_{in} - z_c)^2} +$$

$$\frac{-(x_{in} - x_c)\Delta x - (y_{in} - y_c)\Delta y - (z_{in} - z_c)\Delta z}{\sqrt{(x_{in} - x_c)^2 + (y_{in} - y_c)^2 + (z_{in} - z_c)^2}} + \dots$$

Letting $sr_{c\,in} = \sqrt{(x_{in} - x_c)^2 + (y_{in} - y_c)^2 + (z_{in} - z_c)^2}$ and ignoring higher order terms gives $$sr_{in} \approx sr_{c\,in} - \frac{(x_{in} - x_c)}{sr_{c\,in}} \Delta x - \frac{(y_{in} - y_c)}{sr_{c\,in}} \Delta y - \frac{(z_{in} - z_c)}{sr_{c\,in}} \Delta z.$$

Now, the range difference equation with respect to sensor 1 may be defined for each in so that $$\text{sr\_n}_{in,1} \equiv sr_{in} - sr_1$$

$$\approx sr_{c\,in} - \frac{(x_{in} - x_c)}{sr_{c\,in}} \Delta x - \frac{(y_{in} - y_c)}{sr_{c\,in}} \Delta y - \frac{(z_{in} - z_c)}{sr_{c\,in}} \Delta z$$

$$-sr_{c\,1} + \frac{(x_1 - x_c)}{sr_{c\,1}} \Delta x + \frac{(y_1 - y_c)}{sr_{c\,1}} \Delta y + \frac{(z_1 - z_c)}{sr_{c\,1}} \Delta z$$

$$\approx sr_{c\,in} - sr_{c\,1} + \left( \frac{(x_1 - x_c)}{sr_{c\,1}} - \frac{(x_{in} - x_c)}{sr_{c\,in}} \right) \Delta x +$$

$$\left( \frac{(y_1 - y_c)}{sr_{c\,1}} - \frac{(y_{in} - y_c)}{sr_{c\,in}} \right) \Delta y + \left( \frac{(z_1 - z_c)}{sr_{c\,1}} - \frac{(z_{in} - z_c)}{sr_{c\,in}} \right) \Delta z.$$

Reorganizing the equations in=2, . . . , M as a linear system gives $$G_{ts} \vec{v}_{ts} = \vec{h}_{ts}$$

With this linear system, an iterative approach may be used to compute the values of $(x_{tgt}, y_{tgt}, z_{tgt})$. One of example of an iterative approach is as follows.

The TS TDOA computation begins with range difference values $sr\_n_{in,1}$ already known, for in=2, . . . , M. Then, an initial guess on the values of the object position $x_c^0, y_c^0, z_c^0$) may be made with 0 as an index for initial guess of the iteration. Then, the slant range value $sr_{c\,in}$ may be calculated for in=1, . . . , M based on the guess of the object position. Once $sr_{c\,in}$ is calculated, the linear system $G_{ts} \vec{v}_{ts} = \vec{h}_{ts}$ can be solved as a least squares problem for an over-determined system so that $$\vec{v}_{ts} = (G_{ts}^T Q^{-1} G_{ts})^{-1} G_{ts}^T Q^{-1} \vec{h}_{ts}$$

where Q is the covariance matrix of dimension (M−1)× (M−1) and is related to the random errors associated with the difference in range values, nominally set to 1 along the diagonal and 0.5 for the off-diagonal elements. Then, a new set of guess values can now be computed from $\vec{v}_{ts} = [\Delta x \, \Delta y \, \Delta z]^T$ so that $$\begin{bmatrix} x_c^{N+1} \\ y_c^{N+1} \\ z_c^{N+1} \end{bmatrix} = \begin{bmatrix} x_c^N \\ y_c^N \\ z_c^N \end{bmatrix} + \begin{bmatrix} \Delta x \\ \Delta y \\ \Delta z \end{bmatrix}$$

where N is the iteration index. The steps may be repeated with the new guess of the object position by going back and calculating again. If the initial guess is reasonably accurate, the solution vector should converge to the position of the object $(x_{tgt}, y_{tgt}, z_{tgt})$.

One problem with a TS TDOA computation is that it is an iterative method. If the initial guess is poor, then the iteration may not converge to the correct solution. In particular, when computing the object position using a computer processor the initial guess has to be somewhat close to the correct object position to achieve convergence. This can be inconvenient. In addition, the TS TDOA uses the first order Taylor series approximation, and there may be cases where the approximation gives an incorrect solution as well. However, in some embodiments the TS TDOA computation may be implemented as a reference as discussed below.

Another TDOA computation that avoids some of the drawbacks of the TS TDOA and can be used to compute object position is based upon the work of Chan and Ho. Herein this computation is called the CH TDOA. First, a set of difference equations in slant range are defined with respect to sensor 1 so that for in=1, ..., M, $$sr\_n_{in,1} = sr_{in} - sr_1.$$

Or, $$sr_{in} = sr\_n_{in,1} + sr_1.$$

Squaring both sides gives $$sr_{in}^2 = (sr\_n_{in,1} + sr_1)^2$$
$$= sr\_n_{in,1}^2 + 2sr\_n_{in,1}sr_1 + sr_1^2.$$

On the other hand, $$sr_{in}^2 = (x_{in} - x_{tgt})^2 + (y_{in} - y_{tgt})^2 + (z_{in} - z_{tgt})^2$$
$$= (x_{in}^2 + y_{in}^2 + z_{in}^2) + (x_{tgt}^2 + y_{tgt}^2 + z_{tgt}^2) -$$
$$2x_{in}x_{tgt} - 2y_{in}y_{tgt} - 2z_{in}z_{tgt}.$$

Equating the two gives:

$$sr\_n_{in,1}^2 + 2sr\_n_{in,1}sr_1 + sr_1^2 = (x_{in}^2 + y_{in}^2 + z_{in}^2) + (x_{tgt}^2 + y_{tgt}^2 + z_{tgt}^2) - 2x_{in}x_{tgt} - 2y_{in}y_{tgt} - 2z_{in}z_{tgt}.$$

The terms $x_{tgt}^2$, $y_{tgt}^2$, and $z_{tgt}^2$ make the expression nonlinear. Therefore, a subtraction is applied using the in=1 equation so that for in=2, ..., M, $$sr\_n_{in,1}^2 + 2sr\_n_{in,1}sr_1 + sr_1^2 - sr_1^2 =$$
$$(x_{in}^2 + y_{in}^2 + z_{in}^2) + (x_{tgt}^2 + y_{tgt}^2 + z_{tgt}^2) - 2x_{in}x_{tgt} - 2y_{in}y_{tgt} - 2z_{in}z_{tgt} -$$
$$((x_1^2 + y_1^2 + z_1^2) + (x_{tgt}^2 + y_{tgt}^2 + z_{tgt}^2) - 2x_1 x_{tgt} - 2y_1 y_{tgt} - 2z_1 z_{tgt})$$
$$sr\_n_{in,1}^2 + 2sr\_n_{in,1}sr_1 = -2(x_{in} - x_1)x_{tgt} - 2(y_{in} - y_1)y_{tgt} -$$
$$2(z_{in} - z_1)z_{tgt} + (x_{in}^2 + y_{in}^2 + z_{in}^2) - (x_1^2 + y_1^2 + z_1^2)$$

These equations, for in=2, ..., M, can be recast as a linear system so that $$G_a \vec{v} = \vec{h}$$

where $$G_a = -\begin{bmatrix} 2(x_2 - x_1) & 2(y_2 - y_1) & 2(z_2 - z_1) & 2sr\_n_{2,1} \\ \vdots & \vdots & \vdots & \vdots \\ 2(x_{in} - x_1) & 2(y_{in} - y_1) & 2(z_{in} - z_1) & 2sr\_n_{in,1} \\ \vdots & \vdots & \vdots & \vdots \\ 2(x_M - x_1) & 2(y_M - y_1) & 2(z_M - z_1) & 2sr\_n_{M,1} \end{bmatrix},$$

$$\vec{v} = \begin{bmatrix} x_{tgt} \\ y_{tgt} \\ z_{tgt} \\ rd_1 \end{bmatrix},$$

$$\vec{h} = \begin{bmatrix} sr\_n_{2,1}^2 - (x_2^2 + y_2^2 + z_2^2) + (x_1^2 + y_1^2 + z_1^2) \\ \vdots \\ sr\_n_{in,1}^2 - (x_{in}^2 + y_{in}^2 + z_{in}^2) + (x_1^2 + y_1^2 + z_1^2) \\ \vdots \\ sr\_n_{M,1}^2 - (x_M^2 + y_M^2 + z_M^2) + (x_1^2 + y_1^2 + z_1^2) \end{bmatrix}.$$

Assuming that M>3, the linear system can be solved as a least squares problem.

First, the error vector is defined as $\psi = G_a \vec{v} - \vec{h}$. Since Gaussian errors are involved, the least squares method is applied to minimize $$LS = (\vec{h} - G_a \vec{v})^T (\psi \psi^T)^{-1} (\vec{h} - G_a \vec{v}).$$

which is solved by $$\vec{v} (G_a^T \Psi^{-1} G_a)^{-1} G_a^T \Psi^{-1} \vec{h}$$

where $$\Psi = \text{Exp}(\psi \psi^T),$$
$$= \text{Expectation value of } \psi \psi^T.$$

The covariance matrix $\Psi$ is approximated by $$\Psi = c^2 BQB$$

where $$Q = \begin{bmatrix} 1 & 0.5 & \cdots & \cdots & 0.5 \\ 0.5 & 1 & 0.5 & \cdots & \vdots \\ \vdots & 0.5 & 1 & \ddots & \vdots \\ \vdots & \cdots & \ddots & \ddots & 0.5 \\ 0.5 & \cdots & \cdots & 0.5 & 1 \end{bmatrix},$$

$$B = \text{diag}(sr\_0_2, sr\_0_3, \ldots, sr\_0_M).$$

The matrix Q is the (M−1)×(M−1) covariance matrix of time-difference-of-arrival, and it is assumed that there is some correlation between the time-difference samples as reflected by the nonzero off-diagonal elements. The matrix B is a diagonal matrix with elements ($sr\_0_2$, $sr\_0_3$, ..., $sr\_0_M$). Since B is not known prior to the computation, it is approximated by solving $$\vec{v}_0 = (G_a^T Q^{-1} G_a)_{-1} G_a^T Q^{-1} \vec{h},$$

and determining from $\vec{v}_0$ the approximate slant range values $$(sr\_0_2, sr\_0_3, \ldots, sr\_0_M).$$

Once $\Psi$ is computed from the approximate value of B and Q, $\vec{v}_1$ is computed from $$\vec{v}_1 = (G_a^T \Psi^{-1} G_a)^{-1} G_a^T \Psi^{-1} \vec{h}$$

where $$\vec{v}_1 = [\tilde{x}_{tgt}\ \tilde{y}_{tgt}\ \tilde{z}_{tgt}\ \tilde{sr}_1]^T.$$

Now, the computed solution $\vec{v}_1$ is refined by imposing the condition that $$\tilde{sr}_1^2 = e_1 + e_2 + e_3.$$

where $$e_1 = (x_1 - x_{tgt})^2,$$

$$e_2 = (y_1 - y_{tgt})^2,$$

$$e_3 = (z_1 - z_{tgt})^2.$$

This gives a new over-determined system to solve:

$$e_1 = (x_1 - \tilde{x}_{tgt})^2,$$

$$e_2 = (y_1 - \tilde{y}_{tgt})^2,$$

$$e_3 = (z_1 - \tilde{z}_{tgt})^2,$$

$$e_1 + e_2 + e_3 = \tilde{sr}_1^2.$$

As a linear system, $$\tilde{G}_a \tilde{v} = \tilde{h}$$

where $$\tilde{G}_a = \begin{bmatrix} 1 & 0 & 0 & 0 \\ 0 & 1 & 0 & 0 \\ 0 & 0 & 1 & 0 \\ 1 & 1 & 1 & 1 \end{bmatrix},$$

$$\tilde{v} = \begin{bmatrix} e_1 \\ e_2 \\ e_3 \end{bmatrix},$$

$$\vec{h} = \begin{bmatrix} (x_1 - \tilde{x}_{tgt})^2 \\ (y_1 - \tilde{y}_{tgt})^2 \\ (z_1 - \tilde{z}_{tgt})^2 \\ \tilde{rd}_1^2 \end{bmatrix}.$$

As a least squares problem, the function to be minimized is $$LS = (\tilde{h} - \tilde{G}_a \tilde{v})^T \tilde{\Psi}^{-1} (\tilde{h} - \tilde{G}_a \tilde{v})$$

where the covariance matrix $\tilde{\Psi}$ is approximated by $$\tilde{\Psi} = \tilde{B} G_a^{-1} Q G_a^{T-1} \tilde{B}$$

with $$\tilde{B} = \text{diag}(\tilde{x}_{tgt} - x_1, \tilde{y}_{tgt} - y_1, \tilde{z}_{tgt} - z_1, \tilde{sr}_1).$$

Thus, $$\tilde{v} = (\tilde{G}_a^T \tilde{\Psi}^{-1} \tilde{G}_a)^{-1} \cdot (\tilde{G}_a^T \tilde{\Psi}^{-1}) \tilde{h}$$

$$= (\tilde{G}_a^T (\tilde{B}^{-1} G_a^T Q^{-1} G_a \tilde{B}^{-1}) \tilde{G}_a)^{-1} \cdot (\tilde{G}_a^T (\tilde{B}^{-1} G_a^T Q^{-1} G_a \tilde{B}^{-1})) \tilde{h}.$$

Once $\tilde{v}$ is calculated, the refined solution is computed by $$\begin{bmatrix} x_{tgt} \\ y_{tgt} \\ z_{tgt} \end{bmatrix} = \begin{bmatrix} x_1 \pm \sqrt{e_1} \\ y_1 \pm \sqrt{e_2} \\ z_1 \pm \sqrt{e_3} \end{bmatrix}.$$

Because of the square root involved, there are up to eight possible solutions. In some embodiments, the solution is selected by choosing the solution closest to the approximate solution $(\tilde{x}_{tgt}, \tilde{y}_{tgt}, \tilde{z}_{tgt})$ that was determined above.

In a two dimensional (2-D) case with three sensors, the position of the object can be found without resorting to least squares method. In this case, the difference equations can be written $$\begin{bmatrix} x_2 - x_1 & y_2 - y_1 \\ x_3 - x_1 & y_3 - y_1 \end{bmatrix} \begin{bmatrix} x_{tgt} \\ y_{tgt} \end{bmatrix} = \left( \begin{bmatrix} \text{sr\_n}_{2,1}^2 \\ \text{sr\_n}_{3,1}^2 \end{bmatrix} sr_1 + \frac{1}{2} \begin{bmatrix} \text{sr\_n}_{2,1}^2 - (x_2^2 + y_2^2) + (x_1^2 + y_1^2) \\ \text{sr\_n}_{3,1}^2 - (x_3^2 + y_3^2) + (x_1^2 + y_1^2) \end{bmatrix} \right)$$

$$\begin{bmatrix} x_{tgt} \\ y_{tgt} \end{bmatrix} = \begin{bmatrix} a_1 \cdot sr_1 + b_1 \\ a_2 \cdot sr_1 + b_2 \end{bmatrix}.$$

and substituted into $$sr_1^2 = (x_{tgt} - x_1)^2 + (y_{tgt} - y_1)^2$$

to give $$\alpha \cdot sr_1^2 + \beta \cdot sr_1 + \gamma = 0$$

where $$\alpha = (a_1^2 + a_2^2 - 1),$$

$$\beta = a_1(b_1 - x_1) + a_2(b_2 - y_1),$$

$$\gamma = (b_1 - x_1)^2 + (b_2 - y_1)^2.$$

Solving for $sr_1$ gives $$sr_{1\pm} = \frac{-\beta \pm \sqrt{\beta^2 - 4\alpha\gamma}}{2\alpha}.$$

From $sr_1$, $$\begin{bmatrix} x_{tgt\pm} \\ y_{tgt\pm} \end{bmatrix} = \begin{bmatrix} a_1 \cdot sr_{1\pm} + b_1 \\ a_2 \cdot sr_{1\pm} + b_2 \end{bmatrix}.$$

From the two possible solutions, the correct solution can be determined by calculating the resulting range values and comparing them with the actual data.

In a three dimensional (3-D) case with four sensors, the position of the object can be found without resorting to least squares method. In this case, the difference equations can be written $$\begin{bmatrix} x_2-x_1 & y_2-y_1 & z_2-z_1 \\ x_3-x_1 & y_3-y_1 & z_3-z_1 \\ x_4-x_1 & y_4-y_1 & z_4-z_1 \end{bmatrix} \begin{bmatrix} x_{tgt} \\ y_{tgt} \\ z_{tgt} \end{bmatrix} =$$

$$\left( \begin{bmatrix} \text{sr\_n}_{2,1}^2 \\ \text{sr\_n}_{3,1}^2 \\ \text{sr\_n}_{4,1}^2 \end{bmatrix} sr_1 + \frac{1}{2} \begin{bmatrix} \text{sr\_n}_{2,1}^2 - (x_2^2+y_2^2+z_2^2) + (x_1^2+y_1^2+z_1^2) \\ \text{sr\_n}_{3,1}^2 - (x_3^2+y_3^2+z_3^2) + (x_1^2+y_1^2+z_1^2) \\ \text{sr\_n}_{4,1}^2 - (x_4^2+y_4^2+z_4^2) + (x_1^2+y_1^2+z_1^2) \end{bmatrix} \right), \begin{bmatrix} x_{tgt} \\ y_{tgt} \\ z_{tgt} \end{bmatrix} = \begin{bmatrix} a_1 \cdot sr_1 + b_1 \\ a_2 \cdot sr_1 + b_2 \\ a_3 \cdot sr_1 + b_3 \end{bmatrix}.$$

and substituted into $$sr_1^2 = (x_{tgt}-x_1)^2 + (y_{tgt}-y_1)^2 + (z_{tgt}-z_1)^2$$

to give $$\alpha \cdot sr_1^2 + \beta \cdot sr_1 + \gamma = 0$$

where $$\alpha = (a_1^2 + a_2^2 + a_3^2 - 1),$$

$$\beta = a_1(b_1-x_1) + a_2(b_2-y_1) + a_3(b_3-z_1),$$

$$\gamma = (b_1-x_1)^2 + (b_2-y_1)^2 + (b_3-z_1)^2.$$

Solving for $sr_1$ gives $$sr_{1\pm} = \frac{-\beta \pm \sqrt{\beta^2 - 4\alpha\gamma}}{2\alpha}.$$

From $sr_1$, $$\begin{bmatrix} x_{tgt\pm} \\ y_{tgt\pm} \\ z_{tgt\pm} \end{bmatrix} = \begin{bmatrix} a_1 \cdot sr_{1\pm} + b_1 \\ a_2 \cdot sr_{1\pm} + b_2 \\ a_3 \cdot sr_{1\pm} + b_3 \end{bmatrix}.$$

From the two possible solutions, the correct solution can be determined by calculating the resulting range values and comparing with the actual data.

The CH TDOA may be performed for a nominal 2-D case in the same manner as the TOA computation described above. The sensors are positioned at the same locations as in the 2-D case for the TOA computation.

For this computation, a grid covering a 20 mile×20 mile region and encompassing the sensors is used so that each grid node may be considered to be a object position. Then, for each object position, the CH TDOA method described above may be used to estimate object position based on the noise added range data. A Monte-Carlo or other numeric approximation approach may be employed to compute the standard deviation of the error between the true position of the object and the estimated position of the object. The standard deviation of Gaussian error added to the range may be $\sigma_r = 2.24 \times 10^{-3}$.

Figure 14A:
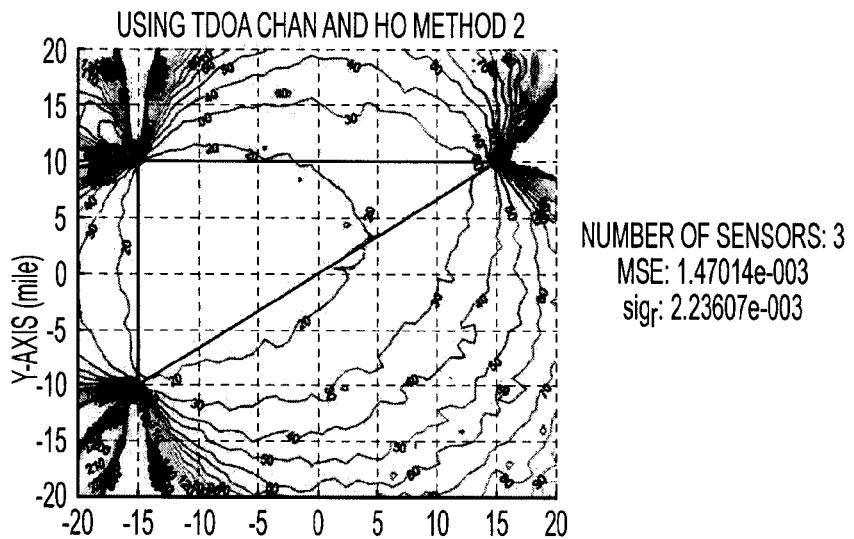
FIG. 14($a$) is a plot of TDOA computation error contours with three sensors according to one embodiment of the invention.
Figure 14B:
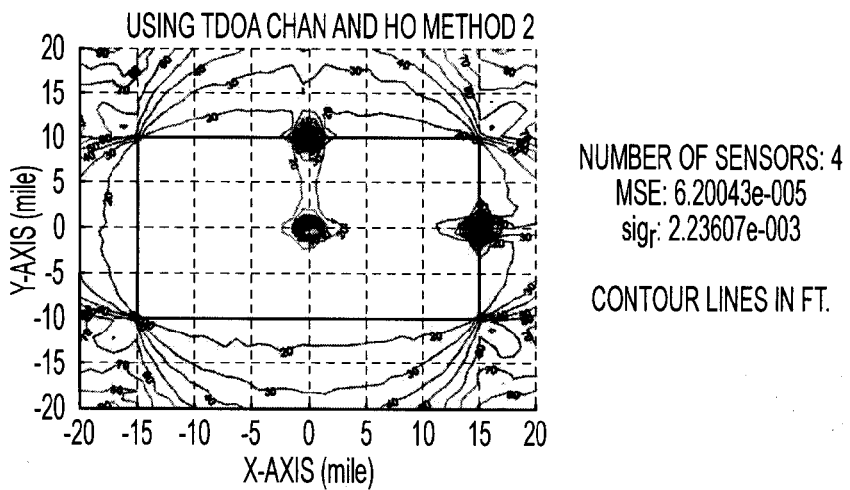
Figure 14C:
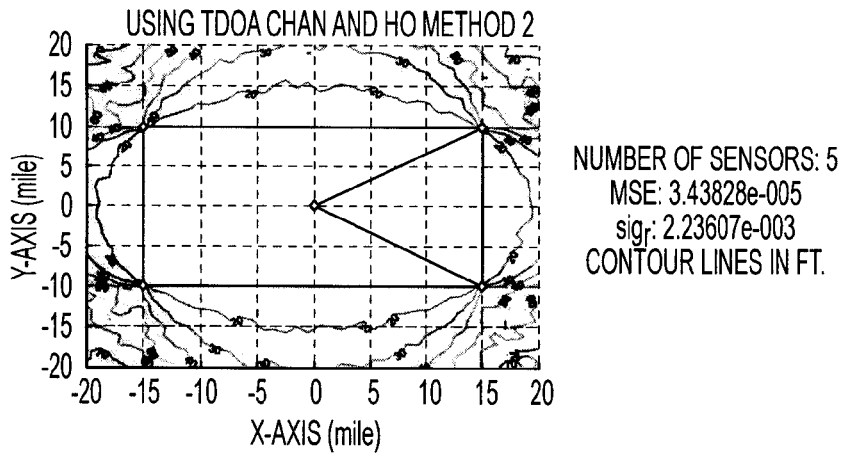

In FIGS. 14(a), 14(b) and 14(c), contour plots of the standard deviation of the resulting errors are shown. As shown in the Figures, the error is small inside the sensor configuration, and it becomes larger for objects positioned away from the center. In particular, as shown in FIG. 14(a), it is the error values are relatively large along the rays that are collinear to the line segments connecting sensor pairs, similar to the results in the TOA computation case for 2-D.

It turns out that along these rays, the discriminant in the quadratic expression of $sr_{1\pm}$ above is zero or nearly zero, and that may contribute to large errors in the CH TDOA calculation.

FIG. 14(b) shows the results for four sensors, there are certain regions inside the sensor configuration where the error increases dramatically. This result differs greatly from the results of the same sensor configuration with the TOA computation. Examining the matrix $G_a$ shows that, if a object is in those regions, either the difference of the range values or the difference of the components of the sensor positions are zero or nearly zero. This renders the matrix $G_a$ nearly singular and results in poor estimation of the object position. On the other hand, and as shown in FIG. 14(c), adding an additional sensor removes these blind spots, and the results appear to be better than that of the results obtained using the TOA computation.

In a manner similar to the TOA computation, the CH TDOA computation can be applied to a nominal 3-D case. In the following, the numbers are dimensionless for convenience, but in practice can correspond to any suitable scale (e.g., miles, kilometers, etc.). The sensors are positioned at the same locations as those used in the 3-D case for the TOA computation.

As before, a grid covering a 20×20×10 dimensionless region and encompassing the sensors is used so that each grid node is considered to be a object position. Then, for each object position or grid node, the CH TDOA computation may be used to estimate object position based on the noise added range data. The standard deviation of Gaussian error added to the range is $\sigma_r = 2.24 \times 10^{-3}$.

FIGS. 15–20 are schematic representations of results of the calculation for each grid node presented in terms of a line segment connecting a true position of the object represented by a circle, and a simulated position of the object, represented by an 'x' symbol, so that the greater the segment length connecting the two points, the worse the error. In other words, where the circle and the x coincide (e.g., ⊗ ) there is relatively small error.

Figure 15:
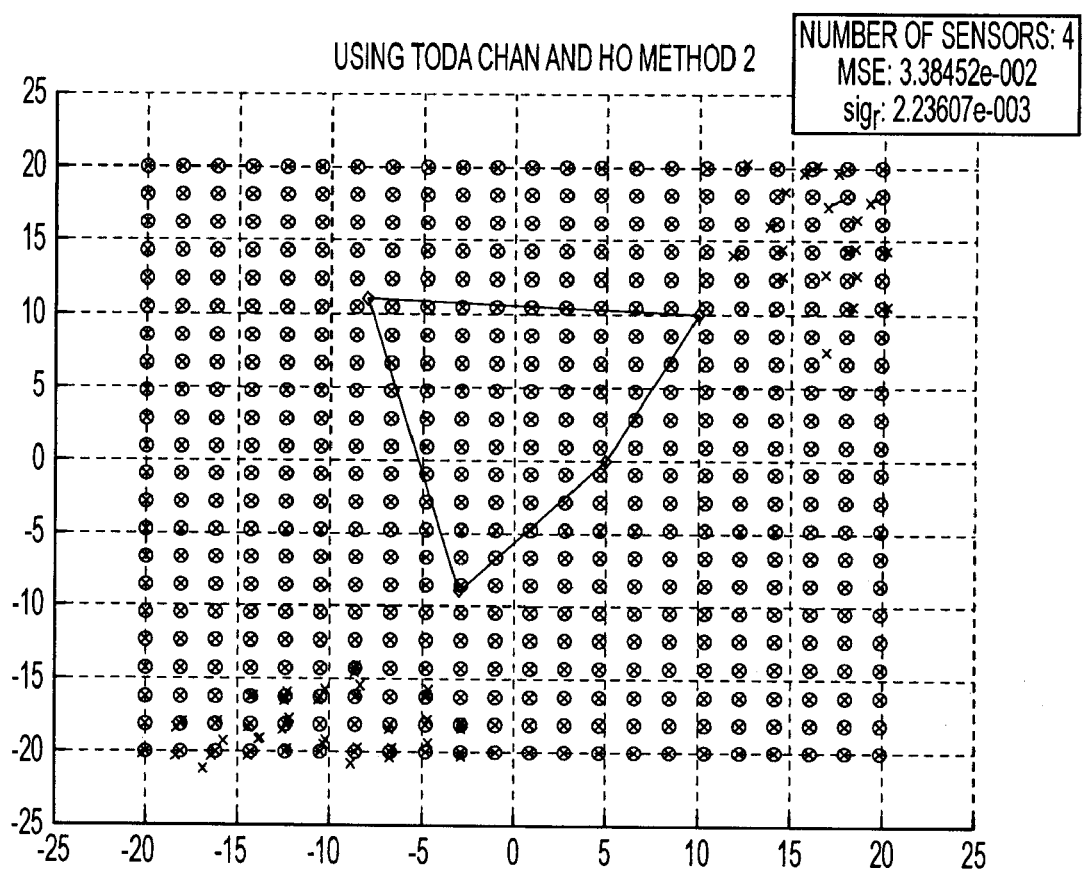
FIG. 15 is a top-view of an error result for a three-dimensional CH-TDOA-based computation with four sensors according to some embodiments of the invention.
Figure 16:
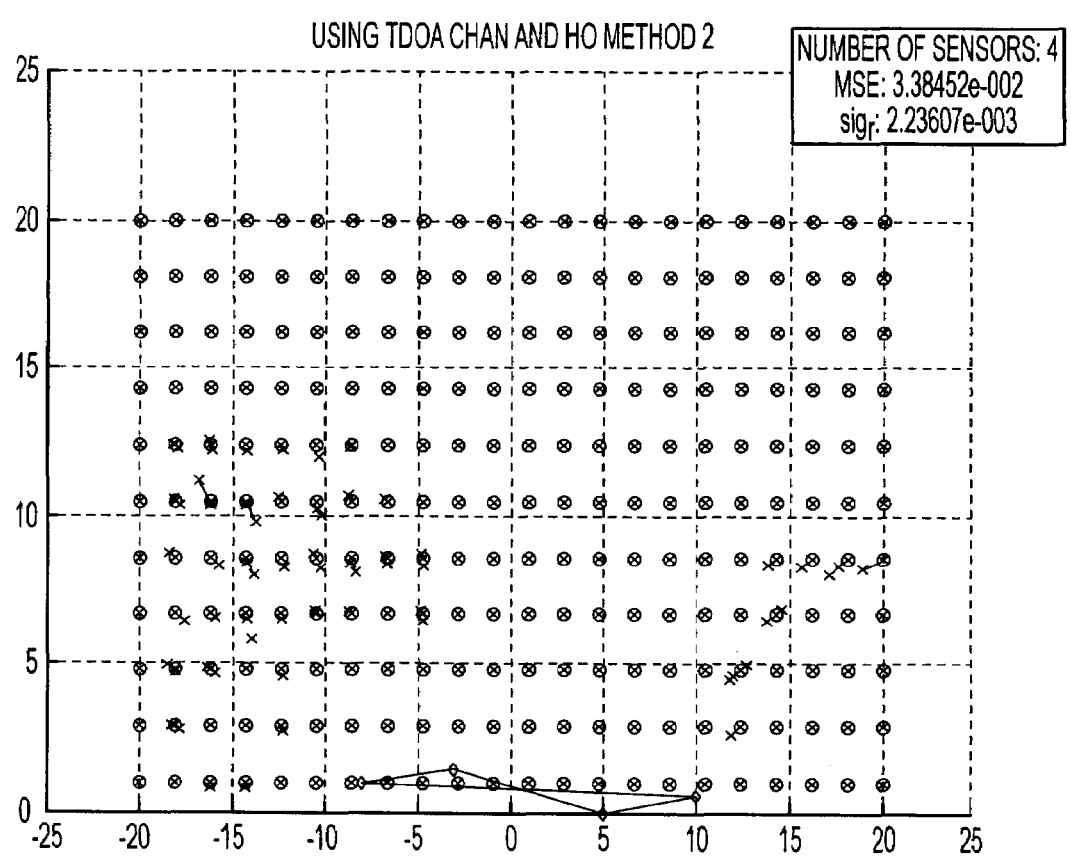
FIG. 16 is a side-view of an error result for a three-dimensional CH-TDOA-based computation with four sensors according to some embodiments of the invention.

FIG. 15 is a schematic representation of the above described error plot for a three dimensional case using four sensors and viewed from the top. FIG. 16 is a schematic of the same three dimensional, four sensor plot as FIG. 15, except the view is from the side.

Figure 17:
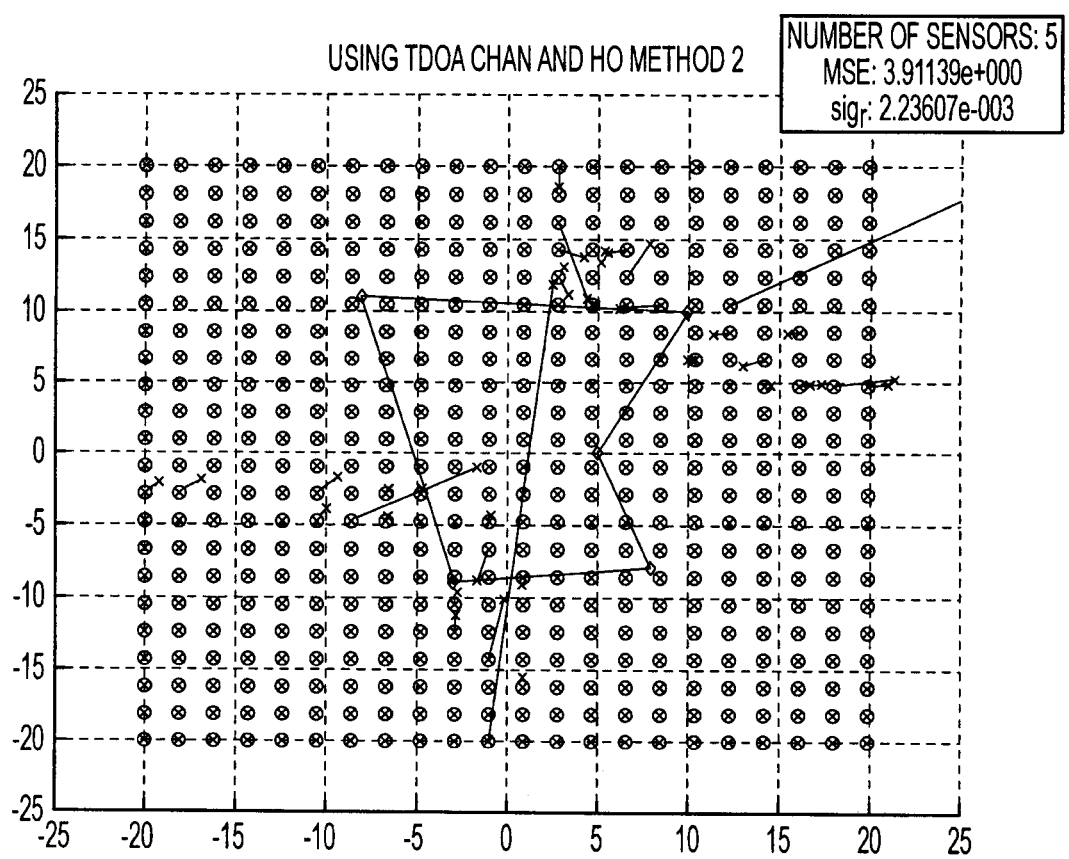
FIG. 17 is a top-view of an error result for a three-dimensional CH-TDOA-based computation with five sensors according to some embodiments of the invention.
Figure 18:
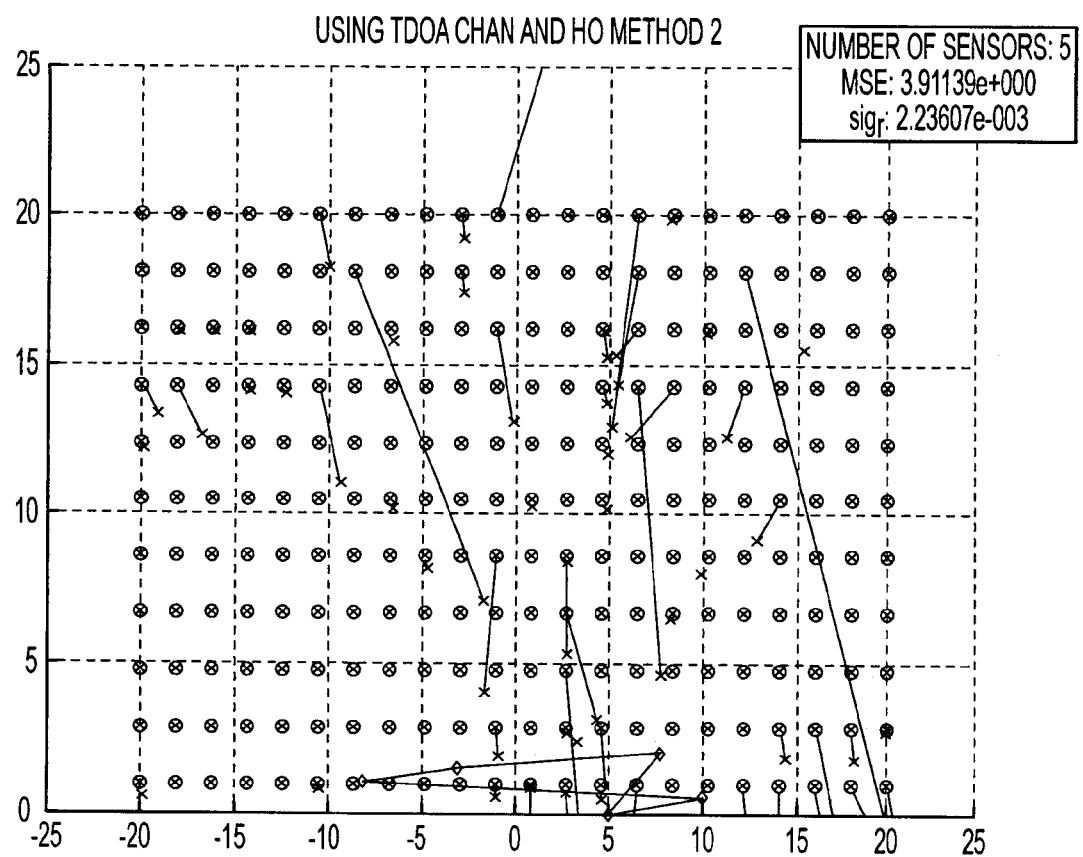
FIG. 18 is a side-view of an error result for a three-dimensional CH-TDOA-based computation with five sensors according to some embodiments of the invention.

FIG. 17 is a schematic representation of the above described error plot for a three dimensional case using five sensors and viewed from the top. FIG. 18 is a schematic of the same three dimensional, five sensor plot as FIG. 17, except the view is from the side.

Figure 19:
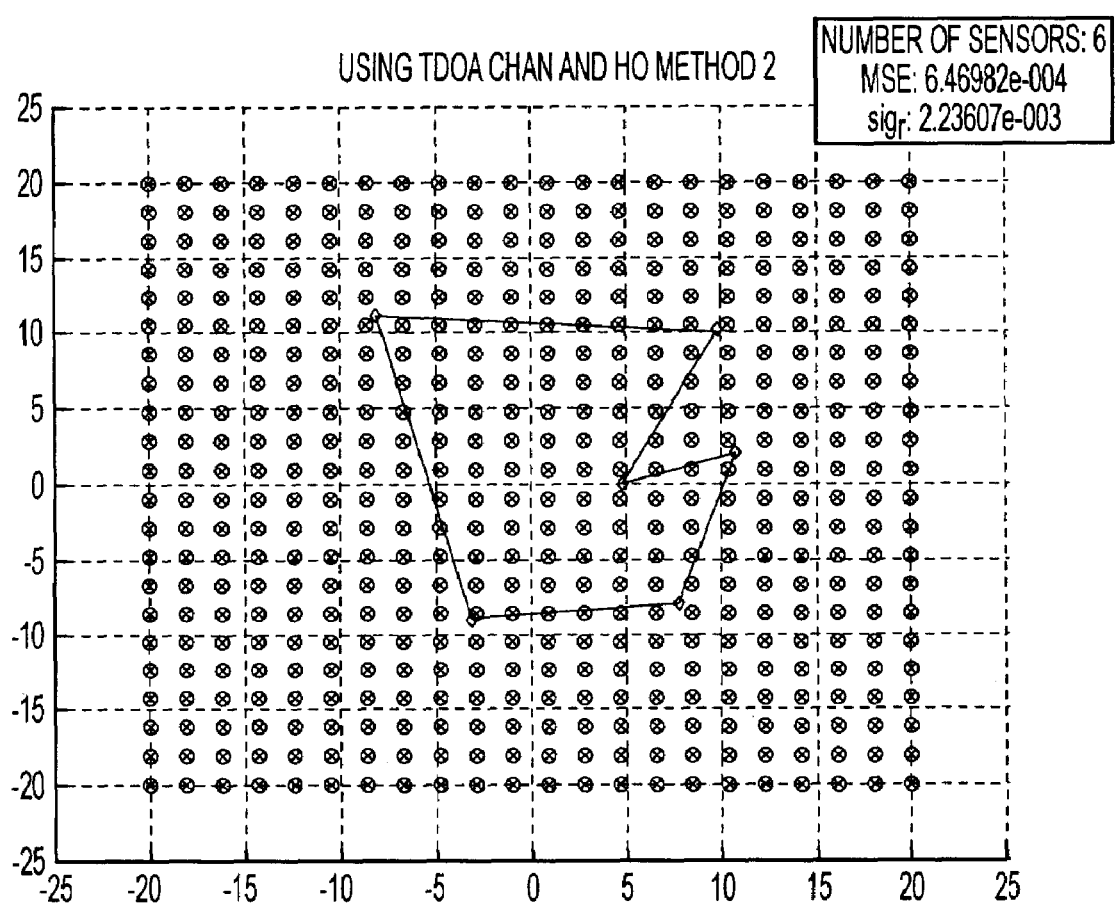
FIG. 19 is a top-view of an error result for a three-dimensional CH-TDOA-based computation with six sensors according to some embodiments of the invention.
Figure 20:
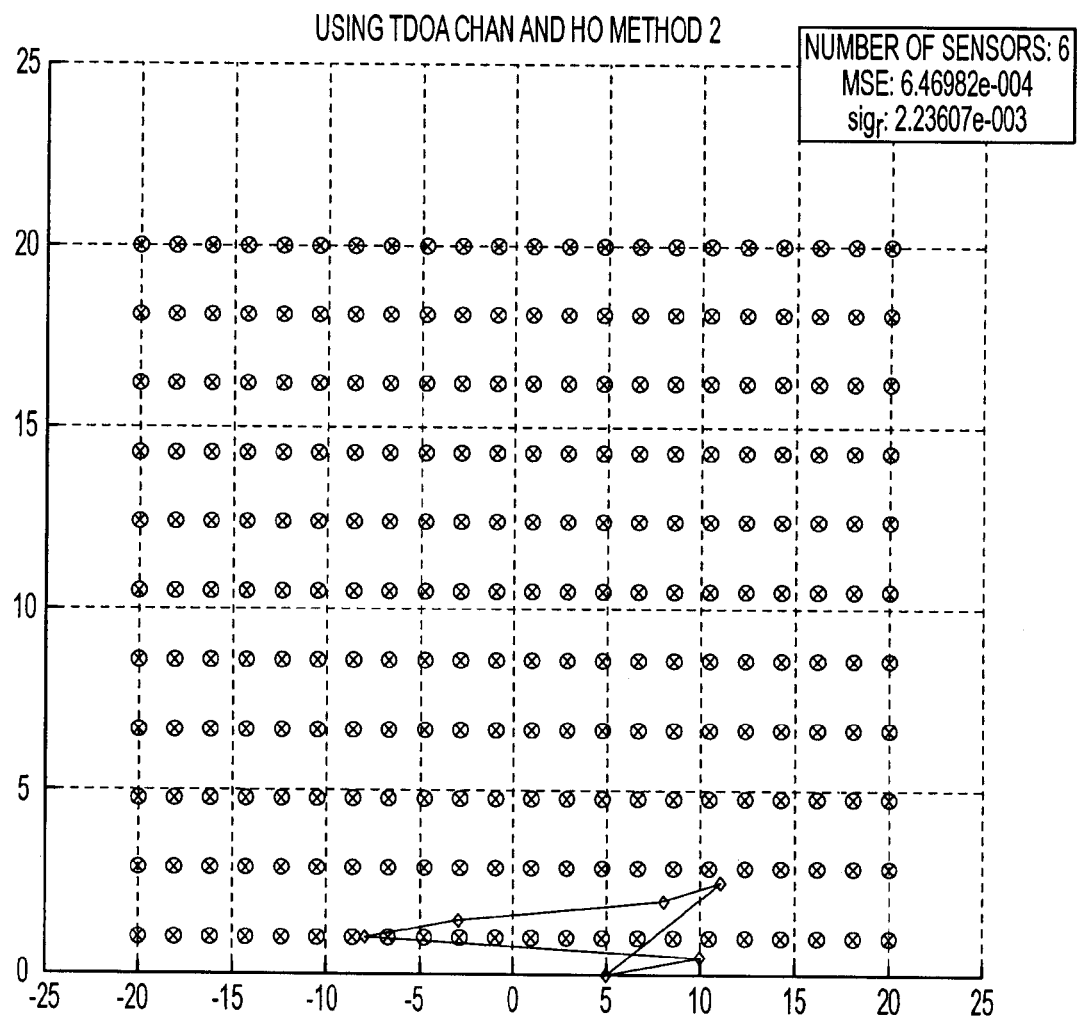
FIG. 20 is a side-view of an error result for a three-dimensional CH-TDOA-based computation with six sensors according to some embodiments of the invention.

FIG. 19 is a schematic representation of the above described error plot for a three dimensional case using six sensors and viewed from the top. FIG. 20 is a schematic of the same three dimensional, six sensor plot as FIG. 19, except the view is from the side.

In FIGS. 15–20 it is shown that near the sensors, the CH TDOA computation gives quite accurate results. Away from the sensors the computation is not as accurate.

The plots in FIGS. 17 and 18 indicate that there are certain localized regions where the $G_a$ matrix is once again nearly singular and causing poor results. Adding one more sensors may dramatically improve the results as shown in FIGS. 19 and 20.

As with the TOA computation, the trend in the values of mean squared error for CH TDOA seems to indicate that adding more sensors may improve the accuracy, but not too much since the sensor positioning along the z-axis is limited.

Comparing the CH TDOA six sensor case in FIGS. 19 and 20 and the TOA six sensor case in FIGS. 12–13 shows that CH TDOA computation is more accurate than the TOA computation especially when multiple sensors are used.

Thus, for some embodiments of the invention, the CH TDOA computation works better in terms of accuracy when the number of sensors used is five or more for 2-D and six or more for 3-D. When the number of sensors is one or two more than the spatial dimension, there may be certain regions or blind spots where the CH TDOA computation fails because the associated matrix $G_a$ becomes nearly singular. In such cases, TOA computation appears to work better.

Referring again to FIG. 2, another embodiment of the invention is described wherein an addition method of computing object position is implemented. As shown in FIG. 2, there are M sensors with differing heights positioned at various locations of the x-y plane. A transmitted, or reflected signal from the object is received by the sensors so that the TOA of the signal from the object to each sensor is known. Assuming that the time of transmission, or reflection, from the object is also known, the slant range from the object to each sensor can be calculated:

$$sr\_0_{in} = c(t\_0_{in} - t_{tgt})$$

for in=1, . . . , M where
$sr\_0_{in}$=Slant range between sensor in and object,
$t\_0_{in}$=Time of arrival,
$t_{tgt}$=Time of transmission or reflection,
c=Speed of light.

It is likely that the actual times of arrival have errors in them; so, a Gaussian noise is added to the time of arrival so that $$t_{in} = t\_0_{in} + N(\sigma_t),$$
$$sr_{in} = c(t_{in} - t_{tgt})$$
$$= c(t\_0_{in} + N(\sigma_t) - t_{tgt})$$
$$= c(t\_0_{in} - t_{tgt}) + cN(\sigma_t)$$
$$sr_{in} = sr\_0_n + N(\sigma_r),$$

where $$\sigma_r = c\sigma_t.$$

The term $N(\sigma)$ denotes a Gaussian random number with variance of $\sigma^2$.

So, the TDOA computation is to be used to calculate the position vector $\vec{P}_{tgt} = [x_{tgt} \, y_{tgt} \, z_{tgt}]^T$ of the object based on the following data set:

$t_{in}$ = Time of arrival, $sr_{in}$ = Slant range from target to sensor, $$\vec{P}s_{in} = \begin{bmatrix} x_{in} \\ y_{in} \\ z_{in} \end{bmatrix} = \text{Position of each sensor,}$$

for in=1, . . . , M.

We introduce the following notations for convenience. First, a pair of nominal vectors is defined as $$\vec{x} = \begin{bmatrix} x_1 \\ x_2 \\ x_3 \end{bmatrix}, \vec{y} = \begin{bmatrix} y_1 \\ y_2 \\ y_3 \end{bmatrix}.$$

Then, an inner product is defined as $$\langle \vec{x}, \vec{y} \rangle = x_1 y_1 + x_2 y_2 + x_3 y_3.$$

The norm of a vector is then defined as $$\|\vec{x}\| = \sqrt{\langle \vec{x}, \vec{y} \rangle}.$$

Using the above notations, for in=2, . . . , M:

$$c(t_{in} - t_1) = c(t_{in} - t_{tgt} + t_{tgt} - t_1)$$
$$= c(t_{in} - t_{tgt}) - c(t_1 - t_{tgt})$$
$$= sr_{in} - sr_1.$$

On the other hand, $$sr_{in} = \|\vec{P}s_{in} - \vec{P}_{tgt}\|.$$

Combining the two expressions gives $$c(t_{in} - t_1) = \|\vec{P}s_{in} - \vec{P}_{tgt}\| - \|\vec{P}s_1 - \vec{P}_{tgt}\|.$$

Multiplying both sides by $\|\vec{P}s_{in} - \vec{P}_{tgt}\| + \|\vec{P}s_1 - \vec{P}_{tgt}\|$ to remove the square roots gives $$c(t_{in}-t_1)(\|\vec{P}s_{in}-\vec{P}_{tgt}\|+\|\vec{P}s_1-\vec{P}_{tgt}\|) = (\|\vec{P}s_{in}-\vec{P}_{tgt}\|-\|\vec{P}s_1-\vec{P}_{tgt}\|)(\|\vec{P}s_{in}-\vec{P}_{tgt}\|+\|\vec{P}s_1-\vec{P}_{tgt}\|)$$
$$= \|\vec{P}s_{in}-\vec{P}_{tgt}\|^2 + \|\vec{P}s_{in}-\vec{P}_{tgt}\|\cdot\|\vec{P}s_1-\vec{P}_{tgt}\| -$$
$$\|\vec{P}s_1-\vec{P}_{tgt}\|\cdot\|\vec{P}s_{in}-\vec{P}_{tgt}\| - \|\vec{P}s_1-\vec{P}_{tgt}\|^2$$
$$= \|\vec{P}s_{in}-\vec{P}_{tgt}\|^2 - \|\vec{P}s_1-\vec{P}_{tgt}\|^2$$

-continued $$= \langle \vec{P}s_{in} - \vec{P}_{tgt}, \vec{P}s_{in} - \vec{P}_{tgt}\rangle - \langle \vec{P}s_1 - \vec{P}_{tgt}, \vec{P}s_1 - \vec{P}_{tgt}\rangle$$

$$= \langle \vec{P}s_{in}, \vec{P}s_{in}\rangle - 2\langle \vec{P}s_1, \vec{P}_{tgt}\rangle + \langle \vec{P}s_{tgt}, \vec{P}_{tgt}\rangle -$$

$$\langle \vec{P}s_1, \vec{P}s_1\rangle + 2\langle \vec{P}s_1, \vec{P}_{tgt}\rangle - \langle \vec{P}s_{tgt}, \vec{P}_{tgt}\rangle$$

$$= \|\vec{P}s_{in}\|^2 - \|\vec{P}s_1\|^2 + \langle 2\vec{P}s_1 - 2\vec{P}s_{in}, \vec{P}s_{tgt}\rangle.$$

On the other hand, $$c(t_{in} - t_1)(\|\vec{P}s_{in} - \vec{P}_{tgt}\| + \|\vec{P}s_1 - \vec{P}_{tgt}\|) = c(t_{in} - t_1)(c(t_{in} - t_{tgt}) + c(t_1 - t_{tgt}))$$

$$= c^2(t_{in} - t_1)(t_{in} + t_1 - 2t_{tgt})$$

$$= c^2(t_{in} - t_1)(t_{in} - t_1) - 2c^2(t_{in} - t_1)t_{tgt}.$$

Combining the two gives:

$$\|\vec{P}s_{in}\|^2 - \|\vec{P}s_1\|^2 + \langle 2\vec{P}s_1 - 2\vec{P}s_{in}, \vec{P}s_{tgt}\rangle = c^2(t_{in}-t_1)(t_{in}+t_1) - 2c^2(t_{in}-t_1)t_{tgt}.$$

Rearranging it gives:
Equation 1:

$$\langle 2\vec{P}s_1 - 2\vec{P}s_{in}, \vec{P}s_{tgt}\rangle + 2c^2(t_{in}-t_1)t_{tgt} = \|\vec{P}s_1\|^2 - \|\vec{P}s_{in}\|^2 + c^2(t_{in}-t_1)(t_{in}+t_1).$$

Now, let the unknown be a vector:

$$\vec{v} = \begin{bmatrix} x_{tgt} \\ y_{tgt} \\ z_{tgt} \\ t_{tgt} \end{bmatrix}.$$

Then, Equation 1 can be set up as a linear system for in=2, ..., M so that $$\begin{bmatrix} 2x_1 - 2x_2 & 2y_1 - 2y_2 & 2z_1 - 2z_2 & 2c(t_2 - t_1) \\ \vdots & \vdots & \vdots & \vdots \\ 2x_1 - 2x_{in} & 2y_1 - 2y_{in} & 2z_1 - 2z_{in} & 2c(t_{in} - t_1) \\ \vdots & \vdots & \vdots & \vdots \\ 2x_1 - 2x_M & 2y_1 - 2y_M & 2z_1 - 2z_M & 2c(t_M - t_1) \end{bmatrix} \begin{bmatrix} x_{tgt} \\ y_{tgt} \\ z_{tgt} \\ t_{tgt} \end{bmatrix} = \begin{bmatrix} \|\vec{P}s_1\|^2 - \|\vec{P}s_2\|^2 + c^2(t_2 - t_1)(t_2 + t_1) \\ \vdots \\ \|\vec{P}s_1\|^2 - \|\vec{P}s_{in}\|^2 + c^2(t_{in} - t_1)(t_{in} + t_1) \\ \vdots \\ \|\vec{P}s_1\|^2 - \|\vec{P}s_M\|^2 + c^2(t_M - t_1)(t_M + t_1) \end{bmatrix},$$

or $$G \cdot \vec{v} = \vec{h}.$$

In yet another embodiment of the invention, there is provided a method for computing object position using relative time of arrival (RTOA) signals. With reference to FIG. 2, there may be Ns sensors with differing heights positioned at various locations of the x-y plane. In addition, there may be an additional radar source. For example, a secondary surveillance radar (SSR) may be incorporated as described below.

Figure 21:
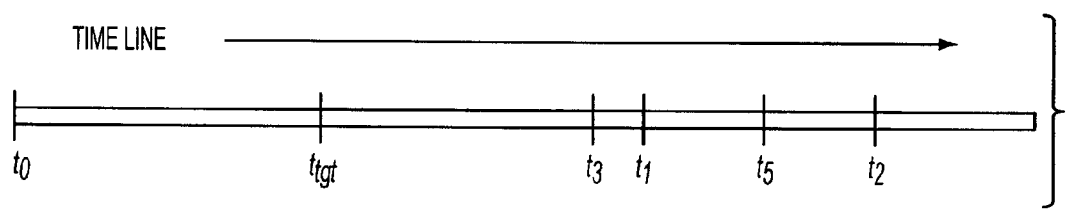
FIG. 21 is a schematic timeline of signals transmitted to a sensor in accordance with some embodiments of the invention.

In FIG. 21, a time history of a signal from the SSR to each of the receiver sensors is shown. The interrogator signal from the SSR radar is transmitted at $t_0$ and is reflected by an object at $t_{tgt}$. The reflected signal is then is received by the sensors so that the time of arrival of the signal from the object to each sensor is known.

The slant range from the object to each sensor can be calculated as:

$$sr_{in} = c(t_{in} - t_{tgt})$$

for in=1, ..., Ns where
$sr_{in}$=Slant range between sensor in and object,
$t_{in}$=Time of arrival,
$t_{tgt}$=Time of reflection,
c=Speed of light.

The slant range from the object to the SSR is calculated as:

$$sr_0 = c(t_{tgt} - t_0).$$

If the position of the object is represented as $\vec{P}_{tgt} = [x_{tgt} \ y_{tgt} \ z_{tgt}]^T$, the slant range between the sensor in and the object is $$sr_{in} = \|\vec{P}s_{in} - \vec{P}_{tgt}\|.$$

So, the proposed RTOA computation is used to calculate the position vector $\vec{P}_{tgt} = [x_{tgt} \ y_{tgt} \ z_{tgt}]^T$ of the object based on the following data set:

$t_0$ = Time of transmission from SSR, $t_{in}$ = Time of arrival,

-continued $$\vec{P}s_{in} = \begin{bmatrix} x_{in} \\ y_{in} \\ z_{in} \end{bmatrix} = \text{Position of each sensor,}$$

$$Ps_{SSR} = \begin{bmatrix} x_{SSR} \\ y_{SSR} \\ z_{SSR} \end{bmatrix} = \text{Position of SSR,}$$

for in=1, ..., Ns.
Using the above notations, for in=1, ..., Ns:

$$c(t_{in} - t_0) = c(t_{in} - t_{tgt} + t_{tgt} - t_0)$$
$$= c(t_{in} - t_{tgt}) + c(t_{tgt} - t_0)$$
$$= sr_{in} + sr_0.$$

On the other hand, it is known that $$sr_{in} = \|\vec{P}s_{in} - \vec{P}_{tgt}\| \text{ and } sr_0 = \|\vec{P}s_{SSR} - \vec{P}_{tgt}\|.$$

Combining the two expressions gives $$c(t_{in}-t_0) = \|\vec{P}s_{in} - \vec{P}_{tgt}\| + \|\vec{P}s_{SSR} - \vec{P}_{tgt}\|,$$

or $$\|\vec{P}s_{in} - \vec{P}_{tgt}\| = c(t_{in}-t_0) - \|\vec{P}s_{SSR} - \vec{P}_{tgt}\|.$$

Squaring both sides gives $$\|\vec{P}s_{in} - \vec{P}_{tgt}\|^2 = (c(t_{in}-t_0) - \|\vec{P}s_{SSR} - \vec{P}_{tgt}\|)^2$$

$$\|Ps_{in}\|^2 - 2\langle \vec{P}s_{in}, \vec{P}_{tgt}\rangle + \|\vec{P}_{tgt}\|^2 = c^2(t_{in}-t_0)^2 -$$
$$2c(t_{in}-t_0)\|\vec{P}s_{SSR} - \vec{P}_{tgt}\| + \|\vec{P}s_{SSR}\|^2 - 2\langle \vec{P}s_{SSR}, \vec{P}_{tgt}\rangle + \|\vec{P}_{tgt}\|^2$$

$$\|\vec{P}s_{in}\|^2 - 2\langle \vec{P}s_{in}, \vec{P}_{tgt}\rangle = c^2(t_{in}-t_0)^2 -$$
$$2c(t_{in}-t_0)\|\vec{P}s_{SSR} - \vec{P}_{tgt}\| + \|\vec{P}s_{SSR}\|^2 - 2\langle \vec{P}s_{SSR}, \vec{P}_{tgt}\rangle.$$

Reorganizing the equation gives $$\langle -2\vec{P}s_{in} + \vec{P}s_{SSR}, \vec{P}_{tgt}\rangle + 2c(t_{in}-t_0)\|\vec{P}s_{SSR} - \vec{P}_{tgt}\| = c^2(t_{in}-t_0)^2 - \|\vec{P}s_{in}\|^2 + \|\vec{P}s_{SSR}\|^2$$

Now, define a new variable $$s\tilde{r}_0 = \|\vec{P}s_{SSR} - \vec{P}_{tgt}\|.$$

This then allows the equations for in=1, ..., Ns to be recast as a linear system of equations $$A_1 \vec{v}_1 = b_1$$

with the unknown vector defined as:

$$\vec{v}_1 = \begin{bmatrix} \tilde{x}_{tgt} \\ \tilde{y}_{tgt} \\ \tilde{z}_{tgt} \\ s\tilde{r}_0 \end{bmatrix}$$

and $$A_1 = \begin{bmatrix} -2x_1 + 2x_{SSR} & -2y_1 + 2y_{SSR} & -2z_1 + 2z_{SSR} & 2c(t_1 - t_0) \\ \vdots & \vdots & \vdots & \vdots \\ -2x_{in} + 2x_{SSR} & -2y_{in} + 2y_{SSR} & -2z_{in} + 2z_{SSR} & 2c(t_{in} - t_0) \\ \vdots & \vdots & \vdots & \vdots \\ -2x_{Ns} + 2x_{SSR} & -2y_{Ns} + 2y_{SSR} & -2z_{Ns} + 2z_{SSR} & 2c(t_{Ns} - t_0) \end{bmatrix}$$

$$b_1 = \begin{bmatrix} c^2(t_1-t_0)^2 - \|\vec{P}s_1\|^2 + \|\vec{P}s_{SSR}\|^2 \\ \vdots \\ c^2(t_{in}-t_0)^2 - \|\vec{P}s_{in}\|^2 + \|\vec{P}s_{SSR}\|^2 \\ \vdots \\ c^2(t_{Ns}-t_0)^2 - \|\vec{P}s_{Ns}\|^2 + \|\vec{P}s_{SSR}\|^2 \end{bmatrix}.$$

The method of least squares can be used to solve this linear system so that $$\vec{v}_1 = (A_1^T P^{-1} A_1)^{-1} A_1^T P^{-1} \cdot b_1$$

where P is the measurement covariance matrix nominally set as identity matrix of dimension Ns×Ns.

Using Chan and Ho's technique, the covariance matrix $H_1$ of the error vector $ev_1 = A_1 \vec{v}_1 - b_1$ is approximated from $\vec{v}_1$:

$$H_1 = c^2 C_1 P C_1$$

where $$C_1 = \begin{bmatrix} \tilde{sr}_1 & 0 & 0 & 0 & 0 \\ 0 & \ddots & 0 & 0 & 0 \\ 0 & 0 & \tilde{sr}_{in} & 0 & 0 \\ 0 & 0 & 0 & \ddots & 0 \\ 0 & 0 & 0 & 0 & \tilde{sr}_{Ns} \end{bmatrix}$$

$$\tilde{sr}_{in} = \|\vec{P}s_{in} - \tilde{P}_{tgt}\|, \tilde{P}_{tgt} = \begin{bmatrix} \tilde{x}_{tgt} \\ \tilde{y}_{tgt} \\ \tilde{z}_{tgt} \end{bmatrix}.$$

Now, a more refined solution vector is computed, if desired, by solving $$\vec{v}_1 = (A_1^T H_1^{-1} A_1)^{-1} A_1^T H_1^{-1} \cdot b_1.$$

Once $\vec{v}_1$ is computed, a refinement step similar to the one employed by Chan and Ho, can be used to obtain a more accurate solution.

Consider a system:

$$d_1 = (x_{SSR} - \tilde{x}_{tgt})^2,$$

$$d_2 = (y_{SSR} - \tilde{y}_{tgt})^2,$$

$$d_3 = (z_{SSR} - \tilde{z}_{tgt})^2,$$

$$d_1 + d_2 + d_3 = \tilde{sr}_0^2.$$

As an over-determined linear system, $$A_2 \vec{v}_2 = b_2$$

where $$A_2 = \begin{bmatrix} 1 & 0 & 0 & 0 \\ 0 & 1 & 0 & 0 \\ 0 & 0 & 1 & 0 \\ 1 & 1 & 1 & 1 \end{bmatrix}, \vec{v}_1 = \begin{bmatrix} d_1 \\ d_2 \\ d_3 \end{bmatrix}, b_2 = \begin{bmatrix} (x_{SSR} - \tilde{x}_{tgt})^2 \\ (y_{SSR} - \tilde{y}_{tgt})^2 \\ (z_{SSR} - \tilde{z}_{tgt})^2 \\ \tilde{sr}_0^2 \end{bmatrix}.$$

As a least squares problem, the function to be minimized is $$LS = (h_2 - A_2 \vec{v}_2)^T H_2^{-1} (h_2 - A_2 \vec{v}_2)$$

where the covariance matrix $H_2$ of error vector $ev_2 = A_2 \vec{v}_2 - b_2$ is approximated by $$H_2 = 4 C_2 F_1 C_2 \text{ with}$$

$$C_2 = \begin{bmatrix} x_{SSR} - \tilde{x}_{tgt} & 0 & 0 & 0 \\ 0 & y_{SSR} - \tilde{y}_{tgt} & 0 & 0 \\ 0 & 0 & y_{SSR} - \tilde{y}_{tgt} & 0 \\ 0 & 0 & 0 & \tilde{sr}_0 \end{bmatrix}$$

and $$F_1 = (A_1 H_1^{-1} A_1)^{-1}.$$

Thus, $$\begin{aligned}
\vec{v}_2 &= (A_2^T H_2^{-1} A_2)^{-1} \cdot (A_2^T H_2^{-1}) h_2 \\
&= \left(A_2^T (C_2 F_1 C_2)^{-1} A_2\right)^{-1} \cdot \left(A_2^T (C_2 F_1 C_2)^{-1}\right) h_2 \\
&= \left(A_2^T \left(C_2 (A_1 H_1^{-1} A_1)^{-1} C_2\right)^{-1} A_2\right)^{-1} \cdot \left(A_2^T \left(C_2 (A_1 H_1^{-1} A_1)^{-1} C_2\right)^{-1}\right) h_2 \\
&= (A_2^T (C_2^{-1} (A_1 H_1^{-1} A_1) C_2^{-1}) A_2)^{-1} \cdot (A_2^T (C_2^{-1} (A_1 H_1^{-1} A_1) C_2^{-1})) h_2
\end{aligned}$$

Once $\vec{v}_2$ is computed, the refined solution to the object position is obtained:

$$x_{tgt} = x_{SSR} \pm \sqrt{d_1}$$

$$y_{tgt} = y_{SSR} \pm \sqrt{d_2}.$$

$$z_{tgt} = z_{SSR} \pm \sqrt{d_3}$$

There are eight possible solutions, and the one that is closest to the coarse solution $[\tilde{x}_{tgt} \, \tilde{y}_{tgt} \, \tilde{z}_{tgt}]^T$ is selected as the object position.

The functional block diagram of the RTOA computation according to some embodiments is shown in FIG. 22. The steps of the RTOA computation can be summarized as follows.

After starting the computation at 2710, the position of the receive sensors, the time of arrival of the signal at the sensors, the position of the SSR radar, and the time of transmission of the interrogator signal are acquired as indicated at 2715. As indicated at 2720, a coarse position of the object is computed by solving $$\vec{v}_1 = (A_1^T P^{-1} A_1)^{-1} A_1^T P^{-1} b_1.$$

At 2725, the approximated covariance matrix $H_1$ is computed from $$H_1 = c^2 C_1 P C_1.$$

At 2730, the coarse solution is refined by solving $$\vec{v}_1 = (A_1^T H_1^{-1} A_1)^{-1} A_1^T H_1^{-1} \cdot b_1.$$

At 2735, all the possible refined solutions of the object position are then computed by solving $$\vec{v}_2 = (A_2^T (C_2^{-1} (A_1 H_1^{-1} A_1) C_2^{-1}) A_2)^{-1} \cdot (A_2^T (C_2^{-1} (A_1 H_1^{-1} A_1) C_2^{-1})) h_2,$$

and, at 2740, using $$x_{tgt} = x_{SSR} \pm \sqrt{e_1}$$

$$y_{tgt} = y_{SSR} \pm \sqrt{e_2}.$$

$$z_{tgt} = z_{SSR} \pm \sqrt{e_3}$$

At 2745, the refined solutions are compared with the coarse solution, and the one that is closest to the coarse solution is selected as the computed object position. At 2750 the computation ends.

Proceeding similarly to the TOA and CH TDOA methods above, the RTOA computation my be performed for a 2D case A Monte-Carlo, or other numerical approximation, approach is used so that the time of arrival data and the time of transmit of the interrogation signal have added Gaussian noise error:

$$t_{in} = t\_0_{in} + N(\sigma_t)$$

where $t\_0_{in}$ = Actual time of arrival $N(\sigma_t)$ = Random Gaussian error of variance $\sigma_t^2$.

After multiple iterations, the RMS error is computed for each computation and then compared.

The TOA, CH TDOA and RTOA computations are applied to a 2-D case with three sensors. The sensors are positioned in units of miles at $$\vec{P}_{S_1} = \begin{bmatrix} 15 \\ 10 \end{bmatrix}, \vec{P}_{S_2} = \begin{bmatrix} -15 \\ 10 \end{bmatrix}, \vec{P}_{S_3} = \begin{bmatrix} -15 \\ -10 \end{bmatrix}.$$

The SSR is positioned at $$\vec{P}_{S_{SSR}} = \begin{bmatrix} 0 \\ 0 \end{bmatrix}.$$

A grid covering the ±20 mile by ±20 mile region with 101 grid points along each side is used as object positions. For each grid node, the three computations are applied with 500 iterations to generate a set of error data so that the RMS error can be computed. The added Gaussian errors to the time of arrival data have the variance of $$\sigma_t^2 = \left(\frac{10 \text{ ft}}{c}\right)^2.$$

Figure 23:
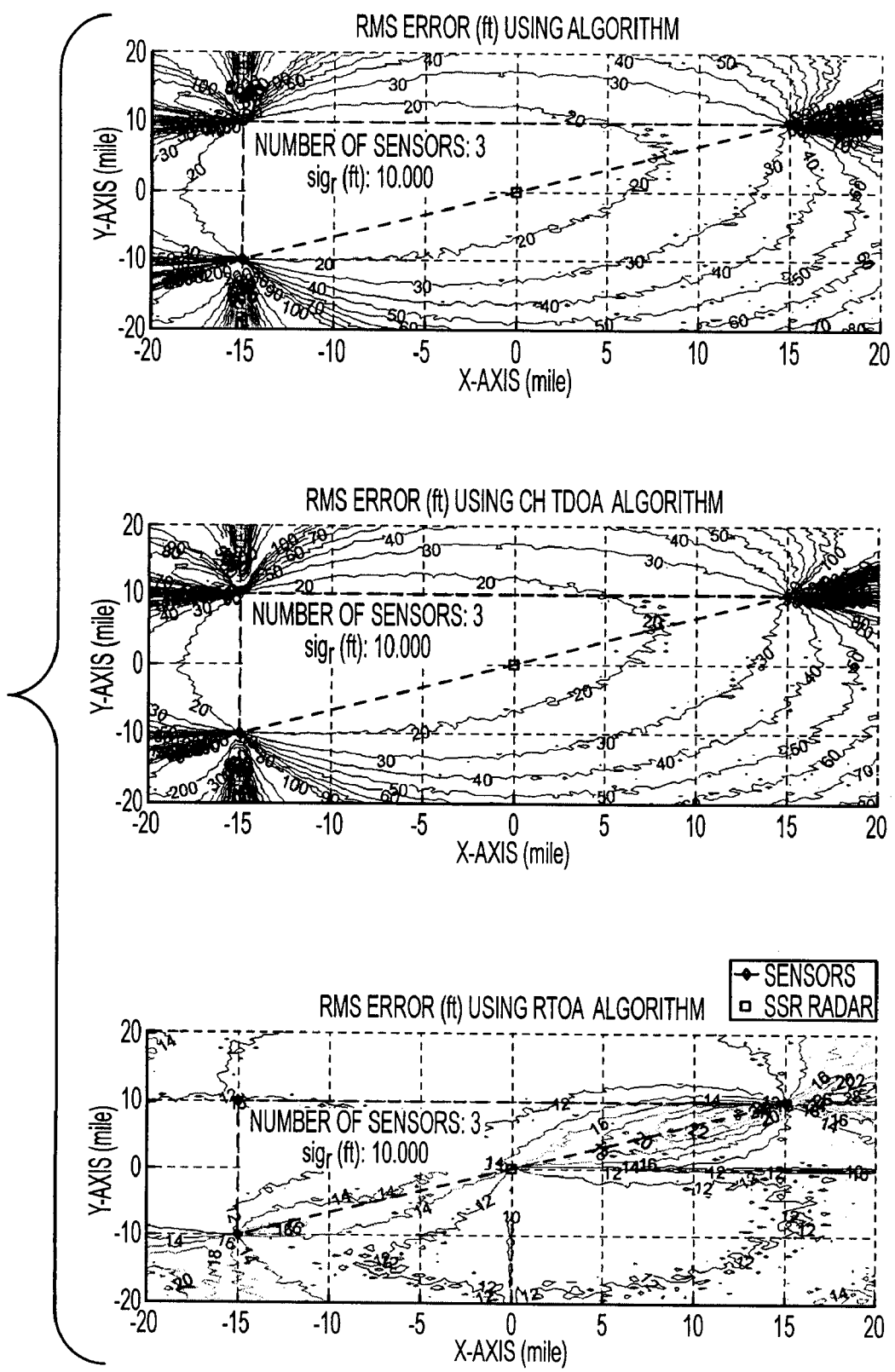
FIG. 23 is a comparison of contour error plots for two-dimensional TOA, CH-TDOA and RTDOA computations with three sensors in accordance with some embodiments of the invention.

In FIG. 23, the resulting contours of the RMS errors for the three multilateration computations are shown. As shown, both the TOA and the TDOA computations have the same RMS errors, which are characterized by a region of very high errors behind the sensors. It is also clear that the RTOA computation gives much lower RMS error values, which implies greater accuracy.

The three multilateration computations are applied to a 2-D case with four sensors. The sensors are positioned in units of miles at $$\vec{P}_{S_1} = \begin{bmatrix} 15 \\ 10 \end{bmatrix}, \vec{P}_{S_2} = \begin{bmatrix} -15 \\ 10 \end{bmatrix}, \vec{P}_{S_3} = \begin{bmatrix} -15 \\ -10 \end{bmatrix}, \vec{P}_{S_4} = \begin{bmatrix} 15 \\ -10 \end{bmatrix}.$$

The SSR is positioned at $$\vec{P}_{S_{SSR}} = \begin{bmatrix} 0 \\ 0 \end{bmatrix}.$$

The same grid as described above is also used in this case, and the added Gaussian errors are set to be the same.

Figure 24:
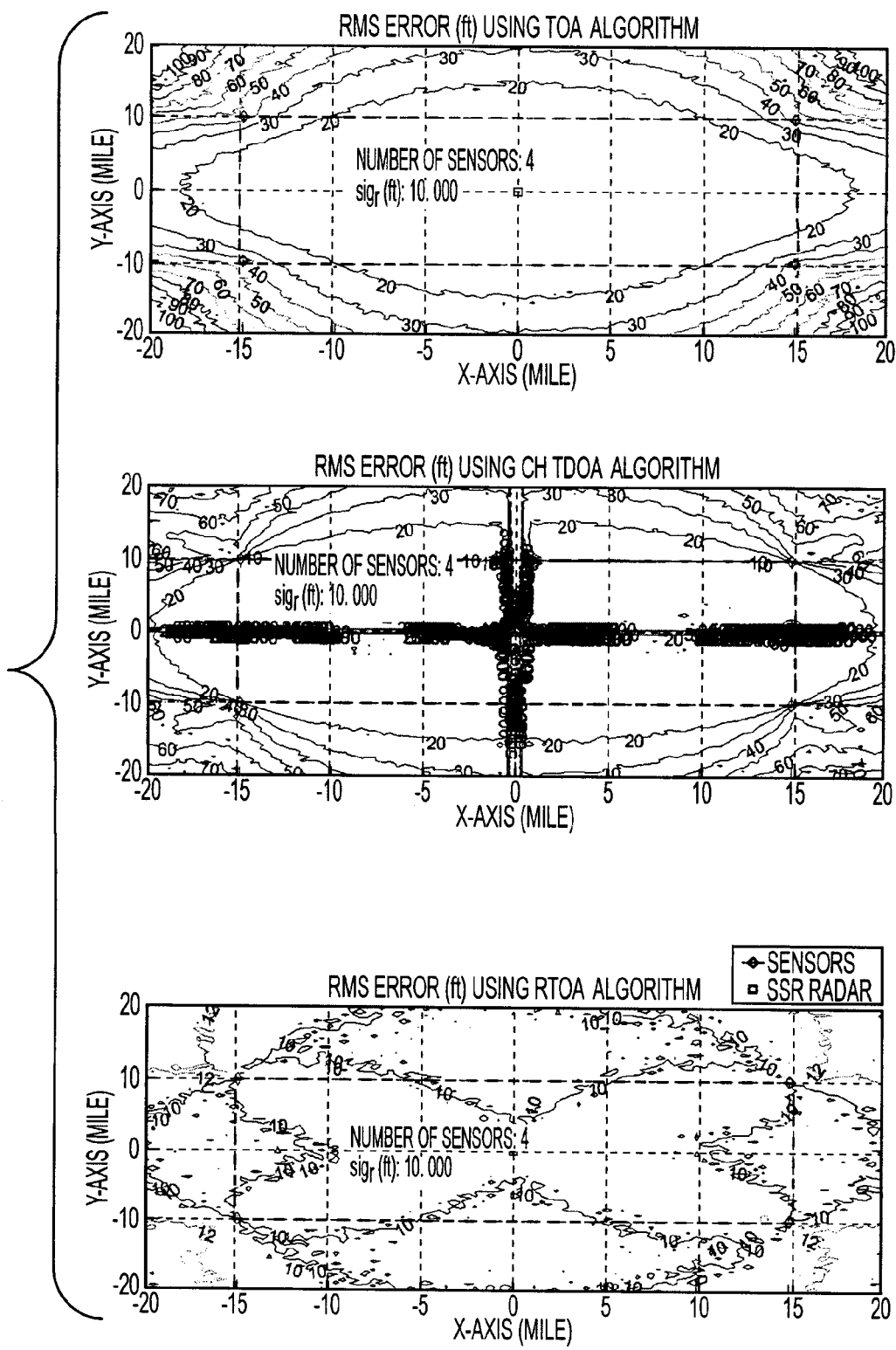
FIG. 24 is a comparison of contour error plots for two-dimensional TOA, CH-TDOA and RTDOA computations with four sensors in accordance with some embodiments of the invention.

In FIG. 24, the resulting contours of the RMS errors for the three multilateration computations are shown. As shown, the TDOA computation is more accurate compared to the TOA computation in most areas except along the vertical and horizontal in the middle where the RMS errors are very large. This is likely due to the geometry of the set up in that along those two lines the matrix of the linear system is nearly singular. Similar to the previous case, the RTOA computation gives much lower RMS error values, which implies greater accuracy.

The three multilateration computations are applied to a 3-D case with four sensors. The sensors are positioned in units of miles at $$\vec{P}_{S_1} = \begin{bmatrix} 15 \\ 10 \\ 0 \end{bmatrix}, \vec{P}_{S_2} = \begin{bmatrix} -15 \\ 10 \\ 0.1 \end{bmatrix}, \vec{P}_{S_3} = \begin{bmatrix} -15 \\ -10 \\ 0.2 \end{bmatrix}, \vec{P}_{S_4} = \begin{bmatrix} 15 \\ -10 \\ 0.3 \end{bmatrix}.$$

The SSR is positioned at $$\vec{P}_{S_{SSR}} = \begin{bmatrix} 0 \\ 0 \\ 0 \end{bmatrix}.$$

A grid covering the ±20 mile by ±20 mile region with 101 grid points along the x- and y-axis positioned at the z-axis height of 10 miles is used as object positions; and for each grid node, the three computations are applied with 500 iterations to generate a set of error data so that the RMS error can be computed. The added Gaussian errors to the time of arrival data have the variance of $$\sigma_t^2 = \left(\frac{10 \text{ ft}}{c}\right)^2.$$

Figure 25:
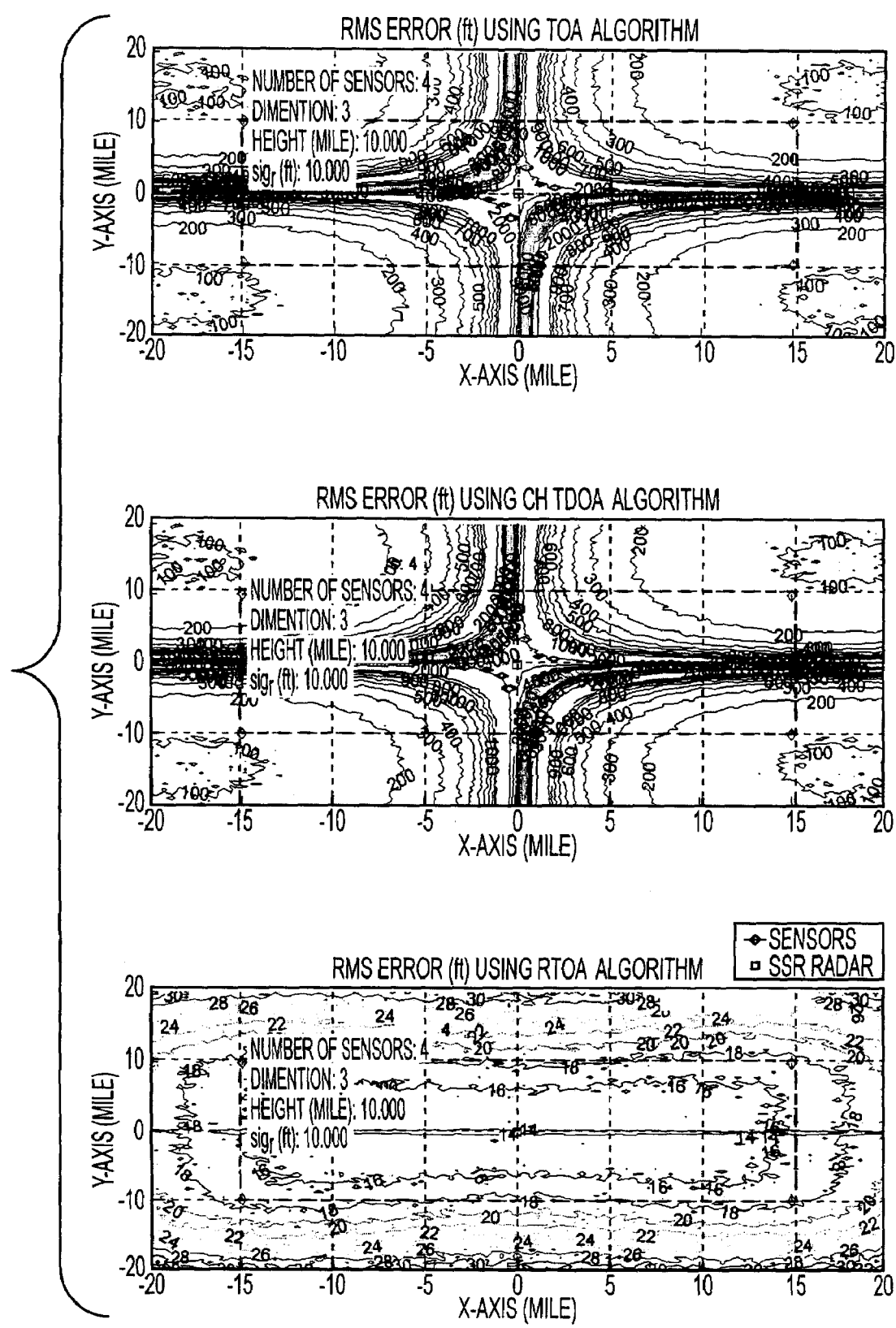
FIG. 25 is a comparison of contour error plots for three-dimensional TOA, CH-TDOA and RTDOA computations with four sensors in accordance with some embodiments of the invention.

In FIG. 25, the resulting contours of the RMS errors for the three multilateration computations are shown. As shown, both the TOA and the TDOA computations have the same RMS errors. It is also clear as before that the RTOA computation gives much lower RMS error values, which implies greater accuracy.

The RTOA computation appears to work better than the previously discussed TOA and TDOA computation in the test cases that are studied here. Adding the time of transmission of the interrogator signal from the SSR appears to greatly increase the accuracy of the new multilateration scheme. On the other hand, it is not always clear how to obtain to for some cases. One possible solution is if the return from the transponder also includes information about $t_0$, then the RTOA computation could work well.

The invention now being fully described, it will be apparent to one of ordinary skill in the art that many changes and modifications can be made thereto without departing from the spirit or scope of the invention as set forth herein. The foregoing describes the preferred embodiments of the present invention along with a number of possible alternatives. These embodiments, however, are merely for example and the invention is not restricted thereto. It will be recognized that various materials and modifications may be employed without departing from the invention described above, the scope of which is set forth in the following claims.

We claim:

1. A method for determining the position of an object in a system comprising a sensor arranged at a determinable location, the method comprising:
   obtaining a time of arrival for a signal received at the sensor
   calculating a slant range from the object to the sensor based, at least in part, upon the obtained time of arrival;
   wherein calculating the slant range further comprises:
   adding a known distribution of noise to the time of arrival; prior to calculating the slant range; and
   determining a position vector based, at least in part, upon the calculated slant range and the location of the sensor.

2. The method of claim 1 wherein the time of arrival is obtained from a signal transmitted from the object.

3. The method of claim 1 wherein the time of arrival is obtained from a signal reflected from the object.

4. The method of claim 1 wherein the known distribution of noise comprises a Gaussian noise distribution with a variance of $\sigma^2$.

5. The method of claim 1 wherein determining a position vector further comprises:
   calculating an error norm for each possible position vector solution; and
   selecting as the object position vector the position vector solution with the smallest error norm.

* * * * *